(12) United States Patent
Harvey

(10) Patent No.: US 10,776,624 B1
(45) Date of Patent: *Sep. 15, 2020

(54) SYSTEMS AND METHODS FOR HAIL DAMAGE VERIFICATION ON ROOFTOPS USING COMPUTER VISION AND ARTIFICIAL INTELLIGENCE

(71) Applicant: State Farm Mutual Automobile Insurance Company, Bloomington, IL (US)

(72) Inventor: Brian N. Harvey, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 161 days.

This patent is subject to a terminal disclaimer.

(21) Appl. No.: 15/915,747

(22) Filed: Mar. 8, 2018

Related U.S. Application Data

(60) Provisional application No. 62/518,942, filed on Jun. 13, 2017, provisional application No. 62/532,450, (Continued)

(51) Int. Cl.
*G06K 9/00* (2006.01)
*G06N 3/08* (2006.01)
(Continued)

(52) U.S. Cl.
CPC ....... *G06K 9/00637* (2013.01); *G06K 9/6202* (2013.01); *G06N 3/04* (2013.01);
(Continued)

(58) Field of Classification Search
CPC .... G06K 9/00637; G06K 9/6202; G06T 7/62; G06T 2207/10032; G06T 2207/20081;
(Continued)

(56) References Cited

U.S. PATENT DOCUMENTS 8,650,106 B1 2/2014 Hopkins, III
9,805,261 B1 10/2017 Loveland
(Continued)

FOREIGN PATENT DOCUMENTS

| EP | 3200139 A1 | 8/2017 |
| WO | 2017091308 A1 | 6/2017 |
| WO | 2017116860 A1 | 7/2017 |

*Primary Examiner* — Ping Y Hsieh
(74) *Attorney, Agent, or Firm* — Armstrong Teasdale LLP

(57) ABSTRACT

A computer system for verifying hail damage and/or detecting hail fraud includes a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing damaged locations to determine a shape and a size of each of the damaged locations; and (vi) determining, based upon the analyzing, whether the damaged locations are a result of hail damage by comparing the shape and the size of at least one damaged location to the shape and the size of at least one other damaged location.

25 Claims, 10 Drawing Sheets

Related U.S. Application Data filed on Jul. 14, 2017, provisional application No. 62/543,014, filed on Aug. 9, 2017.

(51) Int. Cl.
  *G06N 3/04* (2006.01)
  *G06K 9/62* (2006.01)
  *G06T 7/62* (2017.01)

(52) U.S. Cl.
  CPC .............. *G06N 3/08* (2013.01); *G06T 7/62* (2017.01); *G06T 2207/10032* (2013.01); *G06T 2207/20081* (2013.01); *G06T 2207/30184* (2013.01)

(58) Field of Classification Search
  CPC ... G06T 2207/30184; G06N 3/04; G06N 3/08
  See application file for complete search history.

(56) References Cited

U.S. PATENT DOCUMENTS

| | | |
|---|---|---|
| 9,886,771 B1 | 2/2018 | Chen |
| 2017/0124378 A1 | 5/2017 | High |
| 2017/0148102 A1 | 5/2017 | Franke |
| 2017/0249510 A1* | 8/2017 | Labrie ..................... G06K 9/46 |
| 2017/0270650 A1* | 9/2017 | Howe .................. G06K 9/4652 |
| 2019/0114717 A1 | 4/2019 | Labrie et al. |

* cited by examiner

SYSTEMS AND METHODS FOR HAIL DAMAGE VERIFICATION ON ROOFTOPS USING COMPUTER VISION AND ARTIFICIAL INTELLIGENCE

CROSS-REFERENCE TO RELATED APPLICATIONS

This application claims the benefit of priority to U.S. Provisional Patent Application No. 62/518,942, filed Jun. 13, 2017, entitled "SYSTEMS AND METHODS FOR HAIL DAMAGE VERIFICATION ON ROOFTOPS USING COMPUTER VISION AND ARTIFICIAL INTELLIGENCE," to U.S. Provisional Patent Application No. 62/532,450, filed Jul. 14, 2017, entitled "SYSTEMS AND METHODS FOR HAIL DAMAGE VERIFICATION ON ROOFTOPS USING COMPUTER VISION AND ARTIFICIAL INTELLIGENCE," and to U.S. Provisional Patent Application No. 62/543,014, filed Aug. 9, 2017, entitled "SYSTEMS AND METHODS FOR HAIL DAMAGE VERIFICATION ON ROOFTOPS USING COMPUTER VISION AND ARTIFICIAL INTELLIGENCE," the entire contents and disclosure of which are hereby incorporated by reference herein in their entirety.

FIELD OF THE INVENTION

The present disclosure relates to computer systems and methods for hail damage verification, or alternatively for hail fraud detection. More particularly, the present disclosure relates to computer systems and methods for hail damage verification and/or hail fraud, or lack thereof, detection on rooftops using computer vision and artificial intelligence, wherein at least one image of a rooftop is received and analyzed to identify a plurality of damaged locations on the rooftop, and wherein at least some of the plurality of damaged locations are compared to one another to identify anomalies or similarities among the damage locations, and/or determine that the damaged locations on the rooftop are naturally occurring as a result of hail or, in the alternative, that the damaged locations were created as a result of mechanical damage delivered by an individual.

BACKGROUND

In the insurance industry, it is common to insure structures, such as homes, against damage, such as, for example, damage caused by thunderstorms, tornadoes, hurricanes, fires, and floods. In the case of storm damage, structures in the path of the storm may be damaged by hailstones (or hail) generated by the storm. More particularly, the rooftops of structures in the path of a storm may suffer hail damage.

In the aftermath of such a storm, insurance companies may receive and process claims related to hail damage. Where a storm spans a large area or deposits hailstones over a densely populated region, the number of claims made as a consequence of the storm may escalate rapidly. In addition, because each claim may be made in relation to a large surface area (e.g., a rooftop), the expense associated with repairing hail damage in the wake of a thunderstorm may be substantial.

Fraudulent insurance claims of hail damage result in unnecessary expenses for insurance providers. Specifically, in some cases, bad actors may intentionally damage a rooftop in the wake of a storm to give the rooftop the appearance of hail damage, notwithstanding the fact that the rooftop was not damaged by the thunderstorm. To create such mechanical damage, an individual may use a device known as a "lean stick" (e.g., an elongated stick or staff). The individual may repeatedly press the lean stick into the rooftop to produce a series of craters, which, the individual hopes, will be mistaken by the insurance company insuring the structure for hail damage. In other instances, individuals have been known to repeatedly strike a rooftop with a rounded hammer, or, in some cases, to strike a rooftop with a sack, such as a tube sock, filled with rounded objects, such as a plurality of golf balls or rounded stones.

Conventional techniques that attempt to differentiate between damage occurring naturally as a consequence of a thunderstorm, and that as a result of mechanical damage may have several drawbacks, such as being manually intensive, inefficient, annoying, ineffective, and/or time intensive.

BRIEF SUMMARY

The present embodiments relate to systems and methods for hail damage verification, and/or hail fraud, or lack thereof, detection. For example, the systems described herein may receive one or more images of at least a portion of a rooftop, such as a rooftop that has been damaged and with respect to which an insurance claim of hail damage has been submitted. The systems may analyze the received images of the rooftop to identify one or more damaged locations, such as one or more craters. The systems may further analyze dimensional data associated with each damaged location and/or a spacing between or distribution of damaged locations over the surface of the rooftop to determine (i) whether the damage is a result of mechanical damaged created for the purpose of insurance fraud (such as the damaged locations have similarities and/or are spaced evenly), and/or (i) whether the damage is naturally occurring as a result of hail (such as the damaged locations have anomalies and/or are spaced unevenly).

In one aspect, a computer system for verifying hail damage or verifying the accuracy of an insurance claim, and/or detecting hail fraud may be provided. In some exemplary embodiments, the computer system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing, using at least one of a computer vision and an artificial intelligence algorithm, the plurality of damaged locations to determine a shape and a size of each of the plurality of damaged locations; and/or (iv) determining, based upon the analyzing, whether the plurality of damaged locations are a result of hail damage by comparing the shape and the size of at least one damaged location of the plurality of damaged locations to the shape and the size of at least one other damaged location of the plurality of damaged locations. The computer system may include additional, less, or alternate functionality, including that discussed elsewhere herein.

In another aspect, a computer-implemented method for verifying hail damage using computer vision and artificial intelligence may be provided. The method may be implemented using a computer system including a processor in communication with at least one memory. The method may include (i) receiving at least one image of at least a portion of a rooftop; (ii) analyzing the at least one image to identify a plurality of damaged locations; (iii) analyzing, using at least one of a computer vision and an artificial intelligence algorithm, the plurality of damaged locations to determine a shape and a size of each of the plurality of damaged locations; and/or (iv) determining, based upon the analyzing, whether the plurality of damaged locations are a result of hail damage by comparing the shape and the size of at least one damaged location of the plurality of damaged locations to the shape and the size of at least one other damaged location of the plurality of damaged locations. The method may include additional, fewer, or alternate steps, including those discussed elsewhere herein.

In a further aspect, at least one non-transitory computer-readable storage media having computer-executable instructions embodied thereon may be provided. When executed by a computer system including at least one processor in communication with a memory, the computer-executable instructions may cause the at least one processor to perform operations including: (i) receiving at least one image of at least a portion of a rooftop; (ii) analyzing the at least one image to identify a plurality of damaged locations; (iii) analyzing, using at least one of a computer vision and an artificial intelligence algorithm, the plurality of damaged locations to determine a shape and a size of each of the plurality of damaged locations; and/or (iv) determining, based upon the analyzing, whether the plurality of damaged locations are a result of hail damage by comparing the shape and the size of at least one damaged location of the plurality of damaged locations to the shape and the size of at least one other damaged location of the plurality of damaged locations. The storage media may include additional, less, or alternate functionality, including that discussed elsewhere herein.

In another aspect, a computer system for verifying hail damage or verifying the accuracy of an insurance claim, and/or detecting hail fraud may be provided. In some exemplary embodiments, the computer system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing the plurality of damaged locations to determine a distance between each of the plurality of damaged locations; and/or (iv) at least one of: (a) determining, based upon the analyzing, that the distance between at least some of the plurality of damaged locations is substantially uniform to determine that the plurality of damaged locations are not a result of hail damage; or (b) determining, based upon the analyzing, that the distance between at least some of the plurality of damaged locations is not substantially uniform to determine that the plurality of damaged locations are a result of hail damage. The computer system may include additional, less, or alternate functionality, including that discussed elsewhere herein.

In another aspect, a computer system for detecting hail fraud and/or verifying hail damage or verifying the accuracy of an insurance claim may be provided. In some exemplary embodiments, the computer system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing the plurality of damaged locations to determine a distance between each of the plurality of damaged locations, a size of each of the plurality of damaged locations, and a shape of each of the plurality of damaged locations; and/or (iv) analyzing at least one of the distance between each of the plurality of damaged locations, the size of each of the plurality of damaged locations, and the shape of each of the plurality of damaged locations to determine whether the plurality of damaged locations are a result of hail damage. The computer system may include additional, less, or alternate functionality, including that discussed elsewhere herein.

In another aspect, a computer system for hail fraud detection and/or insurance claim accuracy/hail damage verification may be provided. In some exemplary embodiments, the computer system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; and/or (iii) comparing the plurality of damaged locations to each other to determine whether the plurality of damaged locations are a result of hail damage. The computer system may include additional, less, or alternate functionality, including that discussed elsewhere herein.

In yet another aspect, a computer-implemented method for hail fraud detection and/or hail damage verification/insurance claim accuracy verification may be provided. The method may include: (i) receiving, by a processor, at least one image of at least a portion of a rooftop; (ii) analyzing, by the processor, the at least one image to identify a plurality of damaged locations; and/or (iii) comparing, by the processor, the plurality of damaged locations to each other to determine whether the plurality of damaged locations are a result of hail damage. The method may include additional, less, or alternate actions, including those discussed elsewhere herein.

In another aspect, a computer system for verifying hail damage using computer vision and/or artificial intelligence may be provided. The computer system may include comprising: a processor; an associated transceiver; and a non-transitory, tangible, computer-readable storage medium having instructions stored thereon that, in response to execution by the processor, cause the processor and/or associated transceiver to perform operations comprising: receiving (via wired communication, and/or wireless communication or data transmission over one or more radio frequency links or communication channels) or retrieving images or image data of two or more impact signatures or craters in roofing material of a roof of a building; analyzing the images or image data to determine whether one or more anomalies exist among the two or more impact signatures or craters in the roofing material; if one or more anomalies exist among the two or more impact signatures, generating an electronic message indicating that the actual hail damage exists in the roofing material or that the damaged locations in the roofing material are a result of hail damage; and transmitting, via at least one of wired communication, or wireless communication or data transmission over one or more radio frequency links or communication channels, the electronic message to a user mobile device or other computing device to facilitate handling and promptly resolving insurance claims caused by hail damage. The system may include additional, less, or alternate functionality, including that discussed elsewhere herein.

In another aspect, a computer-implemented method for verifying hail damage and/or detecting hail fraud using computer vision and artificial intelligence may be provided.

The method may be implemented using one or more processors and/or transceivers. The method may include: (1) receiving at least one image of at least a portion of a rooftop; (2) analyzing the at least one image to identify a plurality of damaged locations; (3) analyzing the plurality of damaged locations to determine a shape and a size of each of the plurality of damaged locations; and (4) at least one of: (a) determining, based upon the analyzing, that the shape and the size of at least one of the plurality of damaged locations is substantially identical to the shape and the size of at least one other damaged location of the plurality of damaged locations to determine that the plurality of damaged locations are not a result of hail damage; or (b) determining, based upon the analyzing, that the shape and the size of at least one of the plurality of damaged locations is not substantially identical to the shape and the size of at least one other damaged location of the plurality of damaged locations to determine that the plurality of damaged locations are a result of hail damage. The method may include additional, less, or alternate actions, including those discussed elsewhere herein.

In another aspect, a computer-implemented method for verifying hail damage and/or detecting hail fraud using computer vision and artificial intelligence may be provided. The method may be implemented using one or more processors and/or transceivers. The method may include: (1) receiving at least one image of at least a portion of a rooftop; (2) analyzing the at least one image to identify a plurality of damaged locations; (3) analyzing the plurality of damaged locations to determine a distance between each of the plurality of damaged locations; and (4) at least one of: (a) determining, based upon the analyzing, that the distance between at least some of the plurality of damaged locations is substantially uniform to determine that the plurality of damaged locations are not a result of hail damage; or (b) determining, based upon the analyzing, that the distance between at least some of the plurality of damaged locations is not substantially uniform to determine that the plurality of damaged locations are a result of hail damage. The method may include additional, less, or alternate actions, including those discussed elsewhere herein.

In another aspect, a computer-implemented method for verifying hail damage and/or detecting hail fraud using computer vision and artificial intelligence may be provided. The method may be implemented using one or more processors and/or transceivers. The method may include: (1) receiving at least one image of at least a portion of a rooftop; (2) analyzing the at least one image to identify a plurality of damaged locations; (3) analyzing the plurality of damaged locations to determine a distance between each of the plurality of damaged locations, a size of each of the plurality of damaged locations, and a shape of each of the plurality of damaged locations; and (4) analyzing at least one of the distance between each of the plurality of damaged locations, the size of each of the plurality of damaged locations, and the shape of each of the plurality of damaged locations to determine whether the plurality of damaged locations are a result of actual hail damage. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
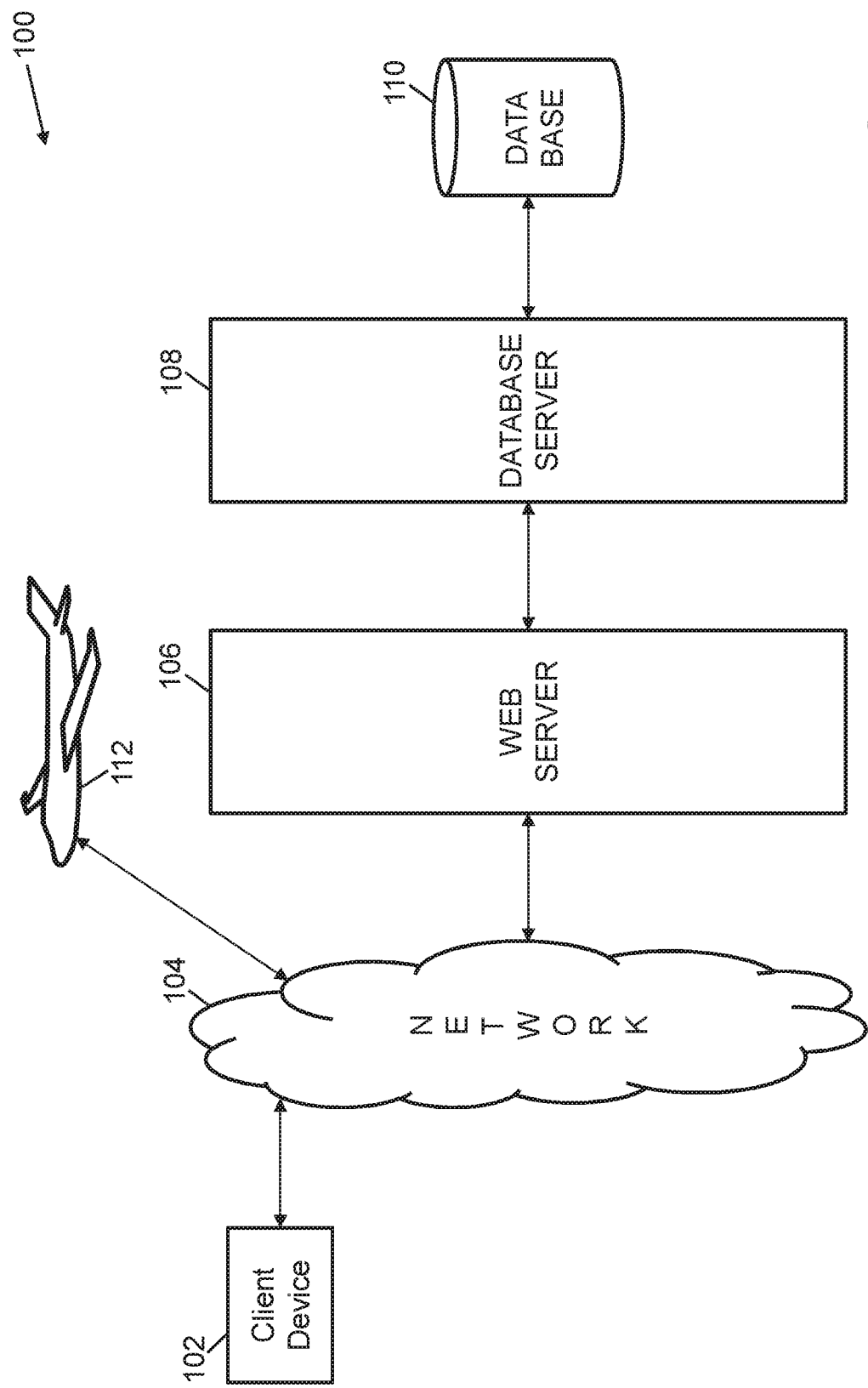
FIG. 1 illustrates a schematic diagram of an exemplary computer system for hail damage verification and/or hail fraud detection using computer vision and artificial intelligence.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for hail damage verification and/or hail fraud detection. In one exemplary embodiment, the process may be performed by at least one frontend system, such as at least one client device, and/or at least one backend system, such as a web server and/or a database server.

Hail damage may occur over an entire surface of a roof or may be isolated to one or more regions over the surface of the roof. In addition, thunderstorms may produce non-uniform hailstones of varying sizes, shapes, weights, and densities. As these non-uniform hailstones strike rooftops in the path of the storm, the hailstones may cause non-uniform damage (e.g., impact craters) to the rooftops. For example, hail damage may be recognizable by a random distribution or randomly spaced distribution of impact craters over the surface of a rooftop and/or include crater spacing anomalies. Similarly, hail damage may be recognizable by fluctuations in the sizes, shapes, and depths of the impact craters created (and/or include crater size anomalies) as each unique hailstone impacts a particular rooftop.

In various embodiments, a backend system may receive at least one image of a rooftop, such as, for example, a rooftop that is damaged and for which an insurance claim of hail damage has been submitted. The at least one image may be captured or acquired in any suitable manner, such as, for example, by a drone aircraft that flies over the rooftop. To this end, the drone may be outfitted with an image capture device, such as a camera. During operation, the drone may receive one or more instructions, such as via a wireless network, which may cause the drone to navigate to the rooftop associated with the insurance claim and/or to capture one or more images of the rooftop. The drone may, in addition, transmit the captured images, via the wireless network, to the backend system.

To detect hail fraud, the backend system may analyze the one or more captured images of the rooftop in question to determine whether the damage to the rooftop is a result of mechanical damaged delivered by an individual (e.g., for the purpose of insurance fraud) and/or naturally occurring as a result of hail. In particular, the backend system may identify a plurality of damaged locations, such as a plurality of craters, spread over the rooftop. The backend system may implement a computer vision algorithm, such as an image recognition algorithm, machine learning algorithms, and/or artificial intelligence for this purpose.

Having identified a plurality of damaged locations, the backend system may compare at least some of the damaged locations to one another to determine whether the damaged locations are a result of mechanical damage and/or whether the damaged locations are a result of hail. For example, the backend system may analyze each of the plurality of damaged locations to determine at least one of a size, a shape, a depth, and/or any other dimensional or geometric data of each of the damaged locations. In some embodiments, the backend system may also analyze the plurality of damaged locations to determine a distance or spacing between each of the damaged locations.

As described above, a hail damaged rooftop may tend to include a plurality of damaged locations, or impact craters, that are dimensionally non-uniform and/or randomly or unequally spaced or distributed (or that have anomalies or differences from each other) over the surface of the rooftop. A mechanically damaged rooftop, on the other hand, may tend to include one or more damaged locations are that are dimensionally uniform and/or equally distributed or spaced over the surface of the rooftop. Thus, to determine the cause of the damage to the rooftop, the backend system may compare the damaged locations to one another (e.g., compare one crater to another crater and/or a plurality of craters to another plurality of craters), and based upon the comparison, the backend system may determine the cause of the damage. Specifically, in the case that at least some of the damaged locations are dimensionally similar and/or substantially uniformly or equally spaced, the backend system may determine that the damage is a result of mechanical damage (e.g., damage created for the purpose of insurance fraud). On the other hand, where the damaged locations (e.g. each crater or a set of craters) are dimensionally different and/or unequally spaced or distributed over the surface of the rooftop (e.g., where anomalies exist), the backend system may determine that the damage is a result of hail damage.

In some embodiments, the backend system may also analyze one or more images of one or more soft metal components on the rooftop (e.g., images of vents, gratings, exhaust features, and the like) to determine whether the damage to the rooftop is naturally occurring, or alternatively a result of mechanical damage. For instance, the backend system may, in some cases, simply analyze the image of the soft metal components on the rooftop to determine whether there is any damage whatsoever to these components. If damage exists, the backend system may determine or verify that the damage to the rooftop is a result of hail damage (e.g., because an individual attempting to cause mechanical damage to the rooftop may be expected to overlook the soft metal components). In other cases, the backend system may analyze the damage to the soft metal components as described herein to determine the cause of the damage. For example, damaged locations having substantially identical dimensional features and/or that are evenly spaced over the surfaces of the soft metal components may suggest mechanical damage, while damaged locations having non-uniform dimensional features and/or a non-uniform distribution or spacing may suggest hail damage.

Thus, the backend system may determine a cause of damage to a rooftop based solely upon an analysis of one or more images of the rooftop in question. The backend system may not, in other words, require an advanced machine learning algorithm, trained on a plurality of images of known hail damage and/or known mechanical damage, to make a determination of a cause of damage to a rooftop.

Exemplary technical effects of the systems, methods, and computer-readable media described herein may include, for example: (a) collection of rooftop data by a drone aircraft or other computing device, such as a land-based rover and/or any other instrument, sensor, or device capable of collecting rooftop data; (b) analysis of the rooftop data to detect a plurality of damaged locations; (c) analysis of the damaged locations in comparison to one another to determine, based upon dimensional data and/or a spacing between the damaged locations, whether the damage is mechanical damaged and/or naturally occurring as a result of hail; and (d) analysis of one or more images of one or more soft metal components on the rooftop to determine whether the damage is mechanical damaged and/or naturally occurring as a result of hail.

Exemplary System for Hail Fraud Detection

As described herein, various system components may be communicatively coupled in any suitable arrangement, such as, for example, via one or more wired and/or wireless connections. Accordingly, although various system components are described herein as capable of wired communication, and/or wireless communications, it will be appreciated that, in various embodiments, such components may communicate in any suitable manner and using any suitable communications protocol, including, for example, combinations of wired and/or wireless communications.

FIG. 1 depicts a view of an exemplary computer system 100 for hail damage verification and/or hail fraud detection using computer vision and artificial intelligence. In one exemplary embodiment, system 100 may include a client device, such as a client device 102. Client device 102 may be associated with an individual, such as a user who has purchased, or who is interested in purchasing, an insurance policy. System 100 may also include network 104, a web server 106, a database server 108, a database 110, and an image capture device, such as a drone 112 capable of flight, a land-based rover (not shown), and/or any other instrument, sensor, and/or device capable of capturing one or more images of a rooftop and/or capable of capturing, scanning, or otherwise obtaining rooftop data, such as image data and/or any other data representative of and/or including dimensional and/or geometric data associated with one or more impact craters on a rooftop. For example, in some embodiments, one or more rooftop mounted sensors, such as a plurality of laser level sensors included in a rooftop mounted laser-level system, may be used to collect rooftop data. Similarly, in other embodiments, one or more range detection systems, such as one or more radar systems, sonar systems, lidar systems, and the like may be used to collect rooftop data.

Accordingly, in the exemplary, client device 102 may be any personal computing device and/or any mobile communications device of a user, such as a personal computer, a tablet computer, a smartphone, and the like. Client device 102 may be configured to present an application (e.g., a smartphone "app") or a webpage, such as webpage or an app for processing or viewing an insurance claim. To this end, client device 102 may include or execute software, such as a web browser, for viewing and interacting with a webpage and/or an app.

Network 104 may be any electronic communications system, such as any computer network or collection of computer networks, and may incorporate various hardware and/or software. Communication over network 104 may be accomplished via wired communication, or wireless communication or data transmission over one or more radio frequency links or communication channels. For instance, communication over network 104 may be accomplished via any suitable communication channels, such as, for example, one or more telephone networks, one or more extranets, one or more intranets, the Internet, one or more point of interaction devices (e.g., point of sale devices, smart phones or mobile devices, cellular phones), various online and/or offline communications systems, such as various local area and wide area networks, and the like.

Web server 106 may be any computer or computer system that is configured to receive and process requests made via HTTP. Web server 106 may be coupled between client device 102 and database server 108. More particularly, web server 106 may be communicatively coupled to client device 102 via network 104. In various embodiments, web server 106 may be directly coupled to database server 108 and/or communicatively coupled to database server 108 via a network, such as network 104. Web server 106 may, in addition, function to store, process, and/or deliver one or more web pages and/or any other suitable content to client device 102. Web server 106 may, in addition, receive data, such as data provided to the app and/or webpage (as described herein) from client device 102 for subsequent transmission to database server 108.

In various embodiments, web server 106 may implement various hardware and/or software, such as, for example, one or more communication protocols, one or more message brokers, one or more data processing engines, one or more servlets, one or more application servers, and the like. For instance, in one embodiment, web server 106 may implement an Internet of Things (IoT) protocol, such as a machine-to-machine IoT communications protocol (e.g., an MQTT protocol). In addition, in various embodiments, web server 106 may implement a message broker program module configured to translate a message or communications from a messaging protocol of a sending device to a messaging protocol of a receiving device (e.g., RABBITTMQ, KAFKA, ACTIVEMQ, KESTREL). Further still, in some embodiments, web server 106 may implement a data processing engine, such as a cluster computing framework like APACHE SPARK. In addition, in various embodiments, web server 106 may implement servlet and/or JSP server, such as APACHE TOMCAT.

Database server 108 may be any computer or computer program that provides database services to one or more other computers or computer programs. In various embodiments, database server 108 may be communicatively coupled between web server 108 and database 110. Database server 108 may, in addition, function to process data received from web server 106.

Database 110 may be any organized collection of data, such as, for example, any data organized as part of a relational data structure, any data organized as part of a flat file, and the like. Database 110 may be communicatively coupled to database server 108 and may receive data from, and provide data to, database server 108, such as in response to one or more requests for data, which may be provided via a database management system (DBMS) implemented on database server 108. In various embodiments, database 110 may be a non-relational database, such as an APACHE HADOOP database.

Drone 112 may be any device capable of capturing an image of a rooftop. For example, drone 112 may be an automated and/or remote controlled device capable capturing one or more aerial images of one or more rooftops. To this end, drone 112 may include an image capture device, such as a camera. Drone 112 may, in addition, include a radio transmitter and/or receiver for receiving one or more instructions (such as a navigation instruction and/or an instruction relating to an area to photograph). The radio transmitter/receiver may also transmit one or more captured images, such as by way of network 104, to client device 102, web server 106, database server 108, and/or database 110. Thus, drone 112 may be used to acquire one or more images of one or more rooftops for analysis and evaluation, as described herein. Additionally or alternatively, a remotely controlled or autonomous land-based rover equipped with a camera may acquire the rooftop images.

Although the components of system 100 are described below and depicted at FIG. 1 as being interconnected in a particular configuration, it is contemplated that the systems, subsystems, hardware and software components, various network components, and database systems described herein may be variously configured and interconnected and may communicate with one another within system 100 to facilitate the processes and advantages described herein. For example, although a single client device 102, a single network 104, a single web server 106, a single database server 108, a single database 110, and a single drone 112 are described above, it will be appreciated that system 100 may include any suitable number of interconnected, communicatively coupled, client device, networks, web servers, database servers, databases, and/or drones. Further, although certain functions, processes, and operations are described herein with respect to one or more system components, it is contemplated that one or more other system components may perform the functions, processes, and operations described herein.

Exemplary Client Device

Figure 2:
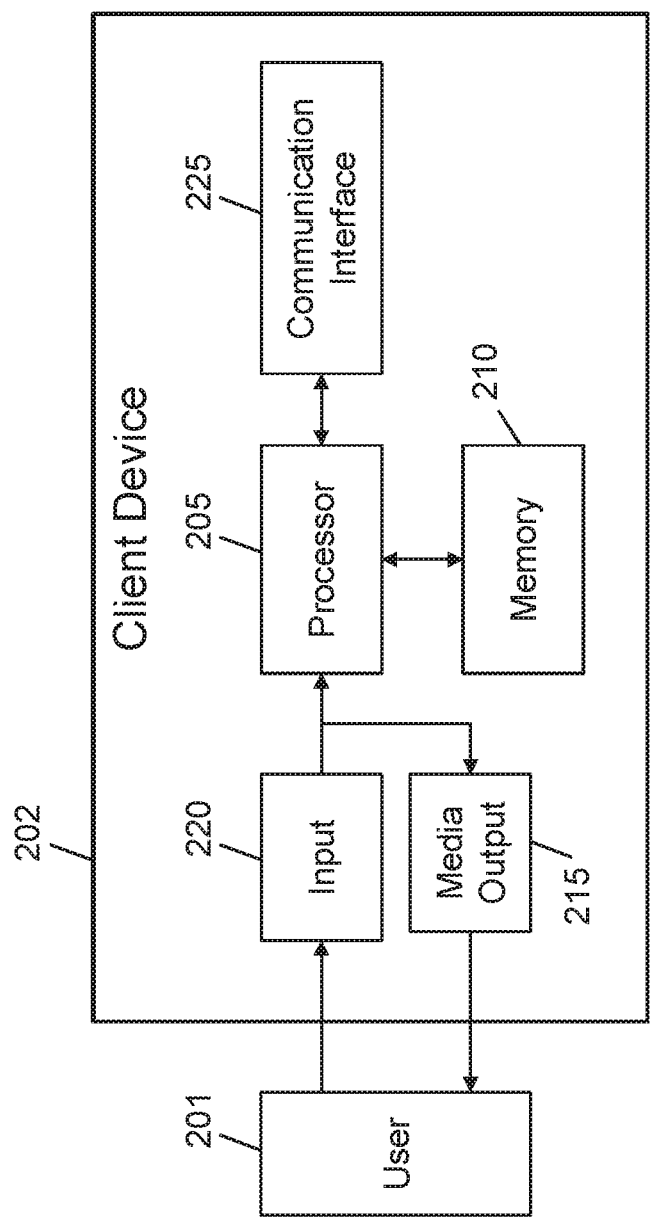
FIG. 2 illustrates an exemplary configuration of a client device shown in FIG. 1, in accordance with one embodiment of the present disclosure.

FIG. 2 depicts an exemplary configuration of a client device 202, such as client device 102, as shown in FIG. 1, and in accordance with one embodiment of the present disclosure. Client device 202 may be operated by a user 201. Client device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computer readable media.

Client device 202 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 215 may be configured to present a graphical user interface (e.g., a web browser and/or a client application) to user 201. A graphical user interface may include, for example, an online store interface for viewing and/or purchasing items, and/or a wallet application for managing payment information. In some embodiments, client device 202 may include an input device 220 for receiving input from user 201. User 201 may use input device 220 to, without limitation, select and/or enter data, such as, for example, one or more report criteria or report filters.

Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Client device 202 may also include a communication interface 225, communicatively coupled via network 110 to web server 112 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website.

Exemplary Database System

Figure 3:
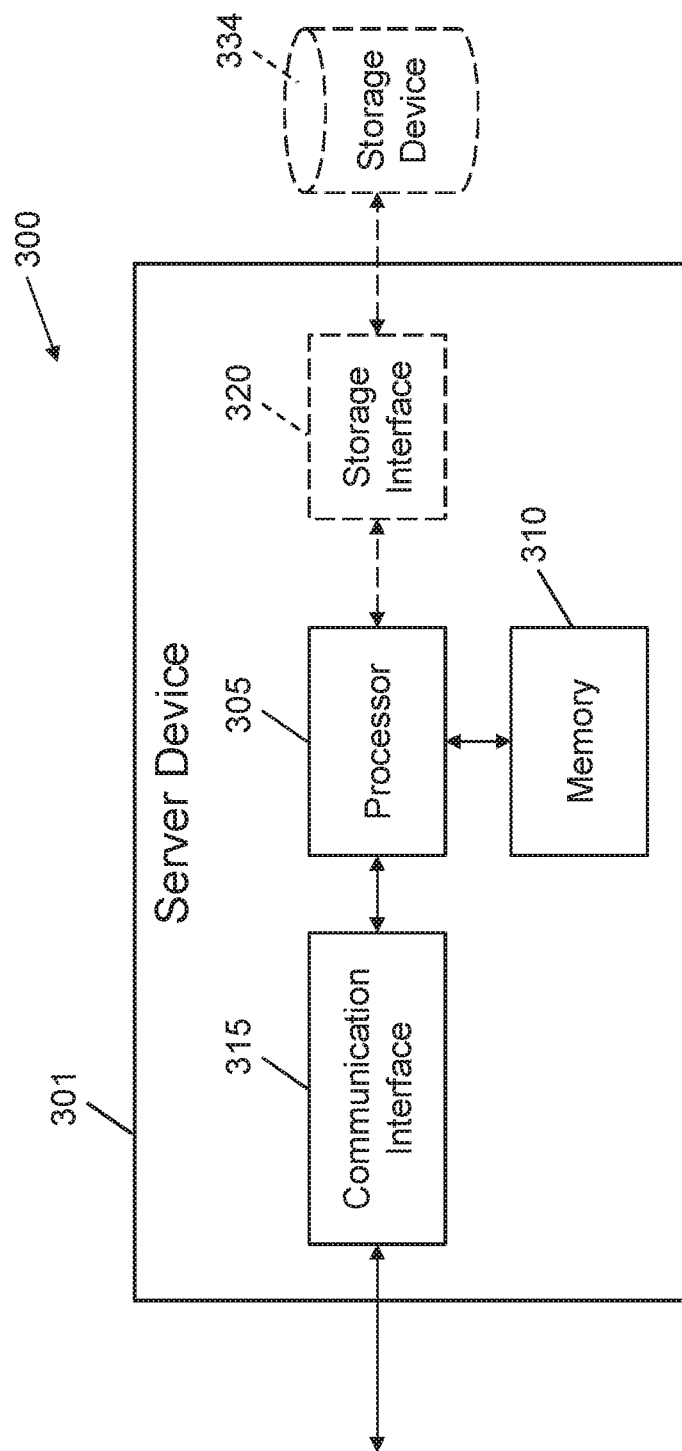
FIG. 3 illustrates an exemplary configuration of a server shown in FIG. 1, in accordance with one embodiment of the present disclosure.

FIG. 3 depicts an exemplary server system 300 such as database server 108 and database 110 and/or web server 106, as shown in FIG. 1, and in accordance with one exemplary embodiment of the present disclosure. Accordingly, server system 300 may include a server computer device 301 (e.g., database server 108), which may, in turn, include a processor 305 for executing instructions. Instructions may be stored in a memory area 310. Processor 305 may include one or more processing units (e.g., in a multi-core configuration).

Processor 305 may be operatively coupled to a communication interface 315 such that server computer device 301 is capable of communicating with a remote computing device, as described above. For example, communication interface 315 may receive requests from client device 202 via the Internet and/or over a computer network.

Processor 305 may also be operatively coupled to a storage device 334 (e.g., database 116). Storage device 334 may be any computer-operated hardware suitable for storing and/or retrieving data, such as, but not limited to, data associated with database 320. In some embodiments, storage device 334 may be integrated in server computer device 301. For example, server computer device 301 may include one or more hard disk drives as storage device 334.

In other embodiments, storage device 334 may be external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Exemplary Mechanically Damaged Rooftop and Exemplary Hail Damaged Rooftop

Figure 4:
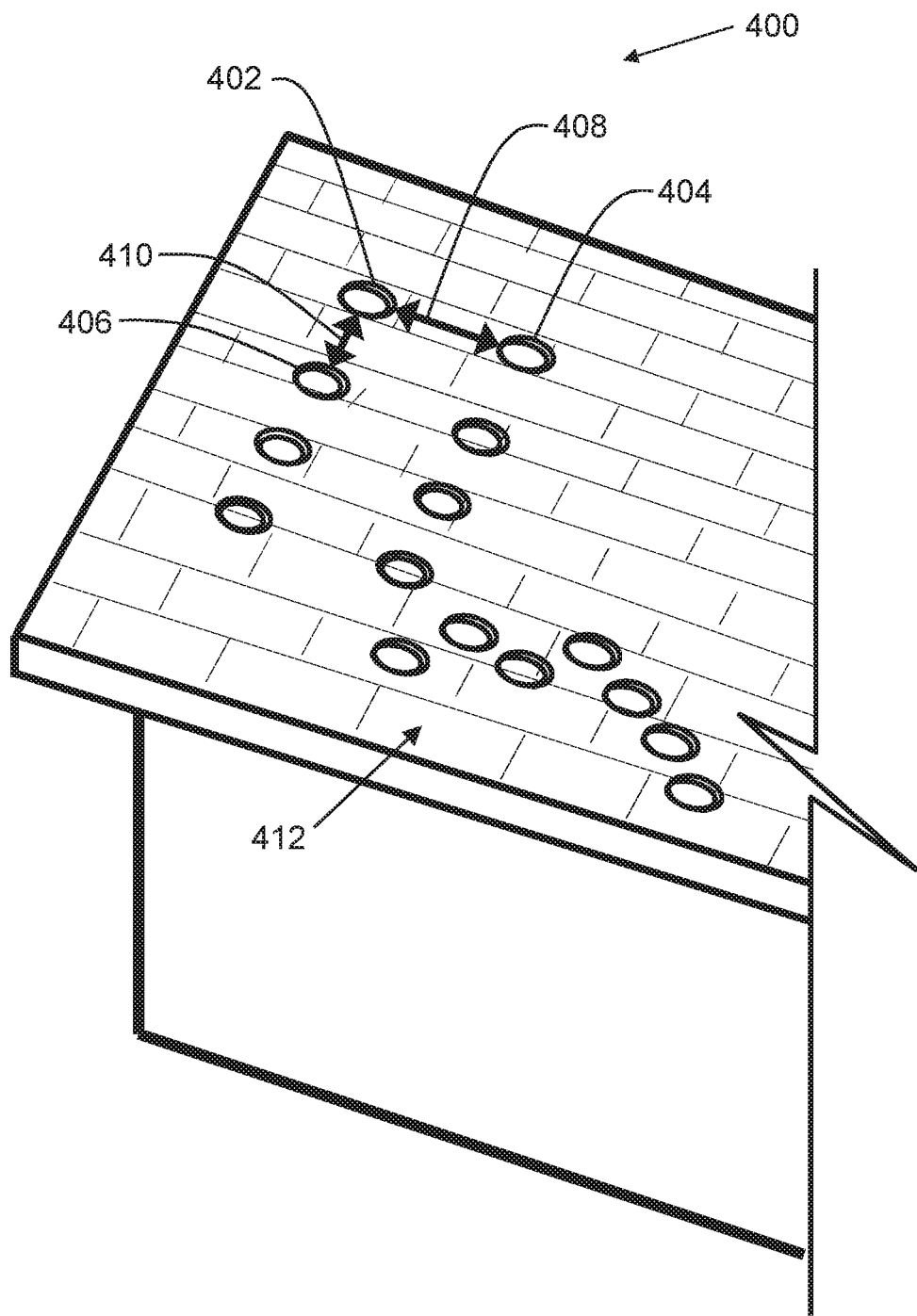
FIG. 4 illustrates an exemplary rooftop that includes fraudulent mechanical damage.

FIG. 4 illustrates an exemplary partial rooftop 400 that includes fraudulent mechanical damage. As described above, fraudulent mechanical damage may be created by an individual using a blunt instrument, such as a "lean stick" (e.g., an elongated stick or staff), a hammer, and/or any other device or instrument capable of creating a depression or crater in a surface of a rooftop.

As shown, the damage caused by a lean stick or hammer may include a plurality of craters, such as, for example, craters 402, 404, and 406. Because the same instrument is used to create each of craters 402, 404, and 406, each of craters 402, 404, and 406 are dimensionally identical or, at least, dimensionally similar. Specifically, each of craters 402, 404, and 406 has an identical or similar shape, an identical or similar size, and/or, in many cases, an identical or similar depth. For example, each of craters 402, 404, and 406 is approximately circular. In addition, the diameter of each crater 402, 404, and 406 is approximately the same, and the depth of each crater 402, 404, and 406 is also approximately the same.

Moreover, in some cases, as can be seen at FIG. 4, the distance between each crater 402, 404, and 406 is roughly uniform. For example, the distance 408 between crater 402 and crater 404 is approximately the same as the distance 410 between crater 402 and crater 406. In many cases, this phenomenon is a consequence of the fact that the individual forming craters 402, 404, and 406 simply moves the instrument (e.g., the lean stick) the individual is using to make craters 402, 404, and 406 by an approximately equal distance each time the individual places the instrument on rooftop 400 to make a new crater. It is possible that the individual might form a plurality of craters in rooftop 400 in a more random, or unequally spaced, and generally arcing arrangement 412; however, as described herein, such an effort may not affect the size, shape, depth, and/or other geometric characteristics of each of the plurality of craters. Moreover, the general arcing arrangement of arrangement 412 may also be indicative of the individual using a hammer to form these craters. Therefore, although arcing arrangement 412 is a more random spacing of craters in rooftop 400 as compared to the spacing of craters 402, 404 and 406, the craters of arrangement 412 are still representative of fraudulent mechanical damage because the other attributes of these craters (e.g., arcing pattern, size, shape, depth, and/or other geometric characteristics) are all the same or similar, and thus, indicate that these craters were more likely produced by an individual using an instrument (e.g., lean stick, hammer, and/or other device) for fraudulent purposes.

Further, in some cases, the individual responsible for fraudulent mechanical damage may strike or otherwise damage each of a plurality of roof tiles substantially in the center of each roof tile. Damage appearing at the center of a plurality of roof tiles may, like size, shape, depth, and spacing, be another telltale sign that the damage to rooftop 400 was caused by the activity of an individual on rooftop 400.

Figure 5:
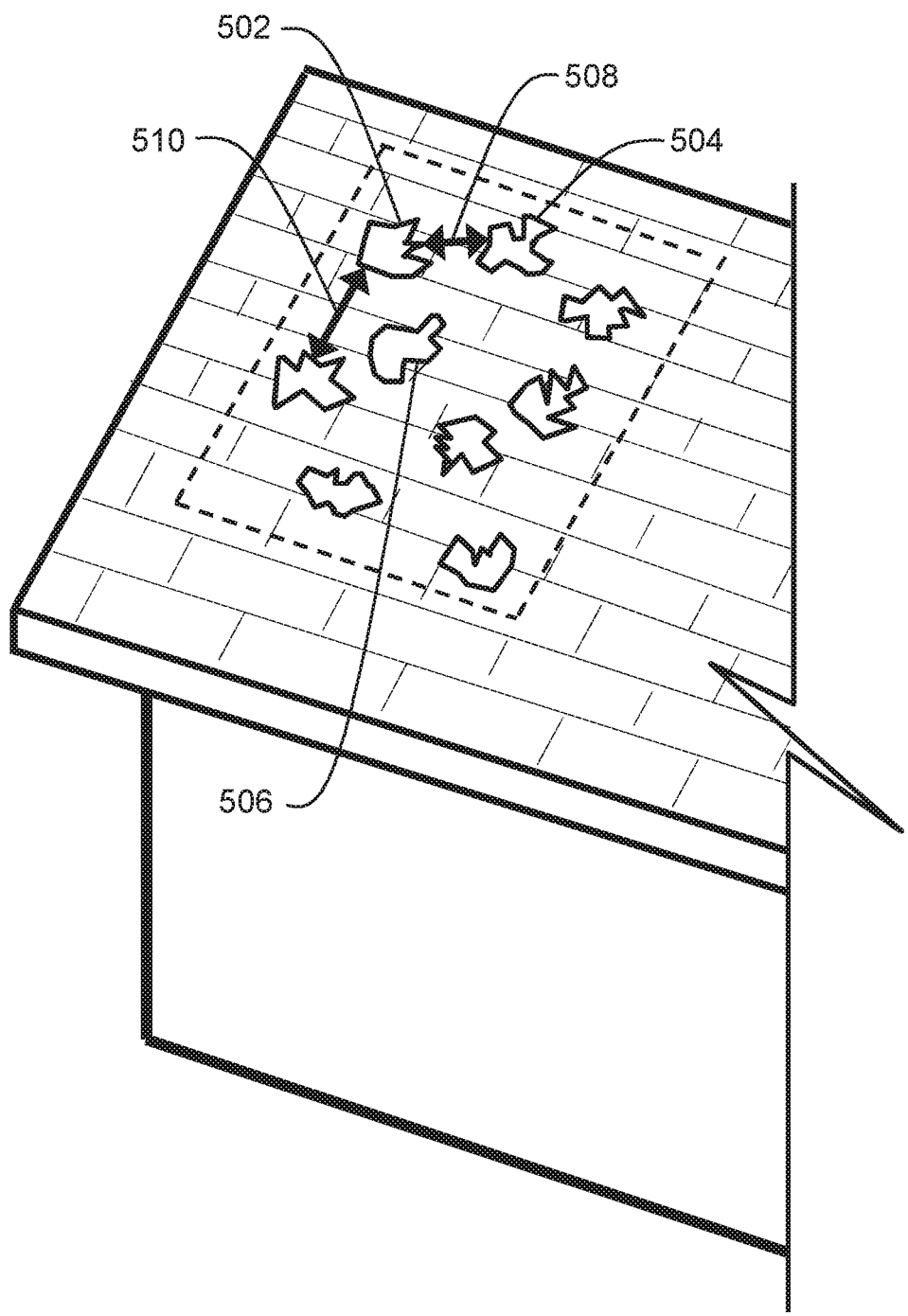
FIG. 5 illustrates an exemplary rooftop that includes hail damage.

FIG. 5 illustrates an exemplary partial rooftop 500 that includes hail damage. Unlike the mechanical damage to rooftop 400, the damage to rooftop 500 is naturally occurring damage resulting from the impact of hailstones on rooftop 500.

Accordingly, and as shown, hail damage may include a plurality of craters, such as, for example, craters 502, 504, and 506. Because the hailstones that created each of craters 502, 504, and 506 are different, each of craters 502, 504, and 506 are dimensionally different or non-uniform. Specifically, each of craters 502, 504, and 506 has a different shape, a different size, and/or, in many cases, a different depth. In addition, the diameters of each crater 502, 504, and 506 are different.

Moreover, as can be seen at FIG. 5, the distance between each crater 502, 504, and 506 is roughly non-uniform. For example, the distance 508 between crater 502 and crater 504 is different from the distance 510 between crater 502 and crater 506.

Exemplary Processes for Hail Fraud Detection

Figure 6:
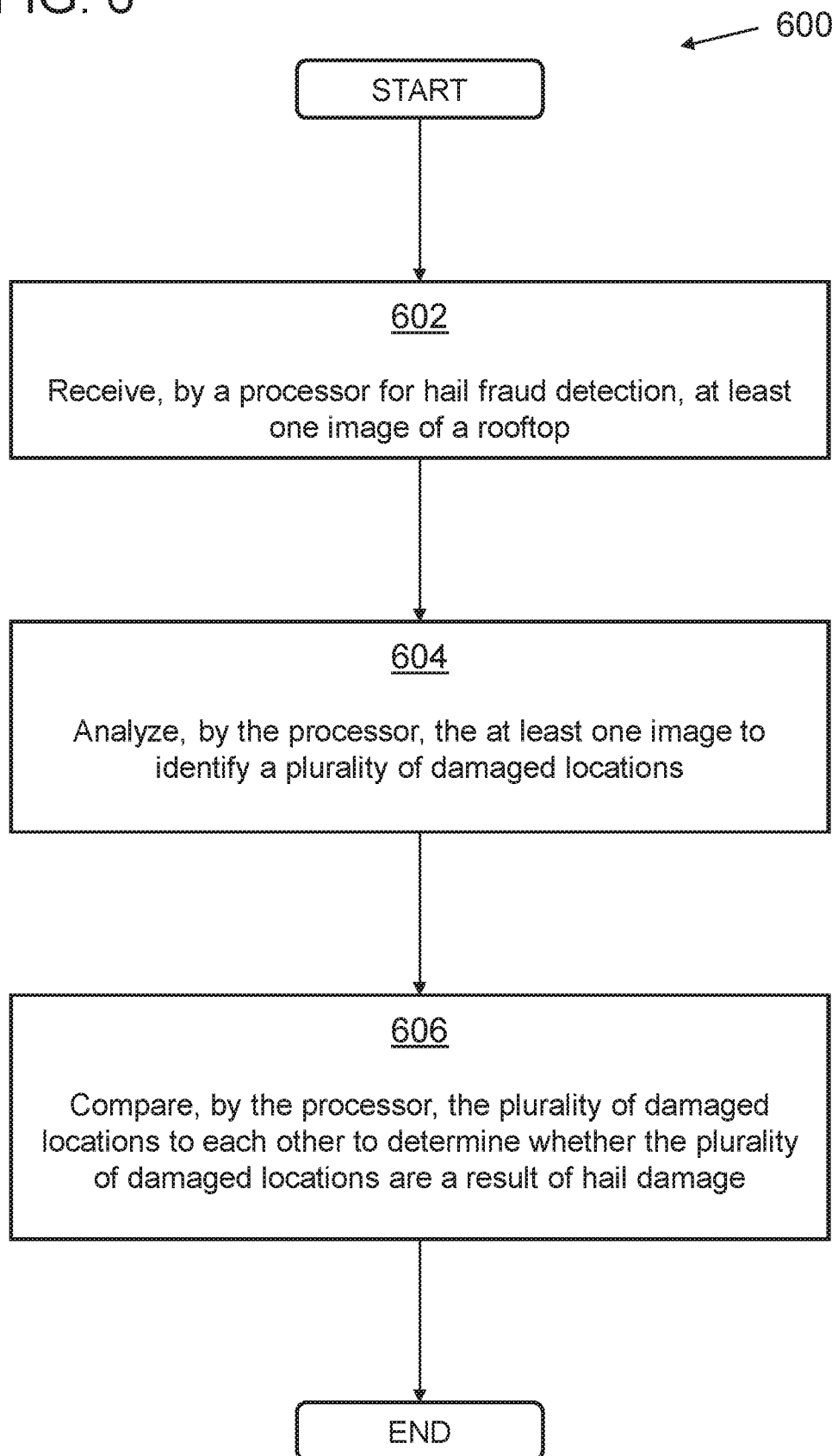
FIG. 6 illustrates a flowchart of an exemplary computer-implemented process implemented by the computer system shown in FIG. 1 for hail damage verification and/or hail fraud detection.

FIG. 6 depicts a flowchart of an exemplary computer-implemented process 400 implemented by computer system 100 (shown in FIG. 1) for verifying actual hail damage and/or detecting hail fraud. Accordingly, in the exemplary embodiment, system 100 (e.g., client device 102, system web server 106 and/or database server 108) may receive at least one image of a rooftop, such as rooftop 400 and/or rooftop 500 (step 602). The image may be received from drone 122 (or additionally or alternatively from a land-based robot remotely controlled or autonomous rover equipped with a camera) via network 104. In addition, in some embodiments, the at least one image may be received from any other suitable image capture device and/or sensor, such as, for example, by a handheld camera and/or, in some cases, by a satellite equipped with one or more image capture devices (e.g., a satellite orbiting the earth). Further, as described above, rooftop data, including image data, may be captured by any other suitable image capture device/sensor and/or data collection system, such as any range detection system (e.g., radar, sonar, and/or lidar system).

System 100 may, in addition, analyze the at least one image of rooftop 400 and/or rooftop 500 to identify a plurality of damaged locations, such as, for example, a plurality of craters (step 604). For example, system 100 may analyze an image of rooftop 400 to identify craters 402, 404, and/or 406. Likewise, system 100 may analyze an image of rooftop 500 to identify craters 502, 504, and/or 506. The plurality of craters may be identified based upon an image recognition process, with may be implemented by way of a computer vision algorithm and/or via an artificial intelligence operating on system 100.

System 100 may also analyze each of the plurality of craters to determine various attributes of each crater. For example, system 100 may analyze each of the plurality of craters to determine a size, a shape, a depth, and/or a diameter of each crater. System 100 may also analyze each of the plurality of craters to determine a distance or spacing between each crater.

To determine whether the plurality of craters are a result of (fraudulent) mechanical damage or whether they are naturally occurring as a result of hail, system 100 may compare one or more craters to one or more other craters on the rooftop being analyzed (step 606).

For example, system 100 may analyze the plurality of craters to determine a shape, a size, a depth, and/or any other dimensional data associated with each of the plurality of craters. Based upon the analysis, system 100 may determine that the shape and the size of at least one of the plurality of craters is substantially identical to the shape and the size of at least one other crater. In such a case (and particularly where a plurality of craters are substantially identical in shape, size, depth, and the like), system 100 may determine that the craters were created as a result of mechanical damage to the rooftop. In other words, system 100 may, as a result, determine that the craters were intentionally created for the purpose of insurance fraud. Such a rooftop is depicted and described above with respect to FIG. 4.

On the other hand, system 100 may analyze the plurality of craters to determine a shape, a size, a depth, and/or any other dimensional data associated with each of the plurality of craters. Based upon the analysis, system 100 may determine that the shape and the size of at least one of the plurality of craters is not substantially identical to the shape and the size of at least one other crater. In such a case (and particularly where a plurality of craters are not substantially identical in shape, size, depth, and the like), system 100 may determine that the craters were not created as a result of mechanical damage to the rooftop but as a result of naturally occurring hail damage. In other words, system 100 may, as a result, determine that the craters were not intentionally created for the purpose of insurance fraud. Such a rooftop is depicted and described above with respect to FIG. 5.

In some embodiments, system 100 may also analyze the plurality of craters to determine a distance or spacing between at least some of the craters. Based upon the analysis, system 100 may determine that the distance between at least some of the craters is substantially identical or substantially uniform. In such a case (and particularly where the distance or spacing between a plurality of craters is substantially uniform), system 100 may determine that the craters were created as a result of mechanical damage to the rooftop. In other words, system 100 may, as a result, determine that the craters were intentionally created for the purpose of insurance fraud. Such a rooftop is depicted and described above with respect to FIG. 4.

On the other hand, system 100 may also analyze the plurality of craters to determine a distance or spacing between at least some of the craters. Based upon the analysis, system 100 may determine that the distance between at least some of the craters is not substantially identical or substantially uniform. Rather, system 100 may determine that the distance or spacing between at least some of the craters is substantially non-uniform or random. In such a case (and particularly where the distance or spacing between a plurality of craters is substantially non-uniform or random, for instance, anomalies or differences among the craters exist), system 100 may determine that the craters were not created as a result of mechanical damage to the rooftop and/or that the craters are naturally occurring as a result of hail. In other words, system 100 may, as a result, verify that actual hail damage exists and/or otherwise determine that the craters were not intentionally created for the purpose of insurance fraud. Such a rooftop is depicted and described above with respect to FIG. 5.

Further, in some embodiments, system 100 may be configured to implement a machine learning algorithm (e.g., by way of an artificial intelligence implemented on system 100). The machine learning algorithm may be configured to compare a plurality of damaged locations, such as a plurality of craters, to a plurality of patterns or shapes or anomalies associated with known hail damage. For example, an artificial intelligence of system 100 may analyze a plurality of rooftops that are known to include hail damage to identify or "learn" one or more patterns, shapes, or other common attributes of rooftops that have experienced hail damage. Additionally or alternatively, an artificial intelligence of system 100 may analyze a plurality of anomalies that are known to include actual hail damage and/or that were caused by hail to identify or "learn" one or more patterns, shapes, or other common attributes of rooftops that have experienced hail damage.

System 100 may analyze a rooftop or perform a comparison of a rooftop (e.g., rooftop 400 and/or rooftop 500) based upon the patterns, shapes, or other common attributes that the artificial intelligence implemented on system 100 has learned to determine whether the rooftop 400 and/or 500 includes actual hail damage or anomalies caused by hail and/or alternatively fraudulent mechanical damage.

In various embodiments, system 100 may also receive at least one image of a soft metal component mounted on a rooftop. A soft metal component may include, for example, a grating, a vent, and/or any other component mounted on a rooftop that is susceptible to hail damage and that is not a roof shingle. System 100 may, in addition to analyses described above, analyze the image of the soft metal component to identify at least one damaged location or anomaly on the soft metal component. For example, system 100 may implement a computer vision algorithm and/or an artificial intelligence to identify one or more damaged locations, such as one or more craters or other anomalies, on the soft metal component.

System 100 may, in addition, determine, based upon the analysis of the soft metal component, whether the craters identified in the soft metal component are a result of naturally occurring hail damage, or alternatively, whether the craters are a result of mechanical damage delivered by an individual for the purposed of insurance fraud.

For example, and as described above, system 100 may analyze a plurality of craters in a soft metal component to determine a shape, a size, a depth, and/or any other dimensional data associated with each of the plurality of craters. Based upon the analysis, system 100 may determine that the shape and the size of at least one of the plurality of craters is substantially identical to the shape and the size of at least one other crater. In such a case (and particularly where a plurality of craters are substantially identical in shape, size, depth, and the like), system 100 may determine that the craters were created as a result of mechanical damage to the soft metal component. In other words, system 100 may, as a result, determine that the craters were intentionally created for the purpose of insurance fraud.

On the other hand, system 100 may analyze the plurality of craters to determine a shape, a size, a depth, and/or any other dimensional data or other anomalies associated with each of the plurality of craters. Based upon the analysis, system 100 may determine that the shape and the size of at least one of the plurality of craters is not substantially identical to the shape and the size of at least one other crater (and/or may be anomaly or different from other craters in a roof). In such a case (and particularly where a plurality of craters are not substantially identical in shape, size, depth, and the like), system 100 may determine that the craters were not created as a result of mechanical damage to the soft metal component but as a result of naturally occurring hail damage. In other words, system 100 may, as a result, determine that the craters were not intentionally created for the purpose of insurance fraud.

In some embodiments, system 100 may also analyze a plurality of craters in a soft metal component to determine a distance or spacing between at least some of the craters. Based upon the analysis, system 100 may determine that the distance between at least some of the craters is substantially identical or substantially uniform. In such a case (and particularly where the distance or spacing between a plurality of craters is substantially uniform), system 100 may determine that the craters were created as a result of mechanical damage to the soft metal component. In other words, system 100 may, as a result, determine that the craters were intentionally created for the purpose of insurance fraud.

On the other hand, system 100 may also analyze the plurality of craters in a soft metal component to determine a distance or spacing between at least some of the craters. Based upon the analysis, system 100 may determine that the distance between at least some of the craters is not substantially identical or substantially uniform. Rather, system 100 may determine that the distance or spacing between at least some of the craters is substantially non-uniform or random. In such a case (and particularly where the distance or spacing between a plurality of craters is substantially non-uniform or random), system 100 may determine that the craters were not created as a result of mechanical damage to the soft metal component and/or that the craters are naturally occurring as a result of hail (to verify actual hail damage had occurred). In other words, system 100 may, as a result, determine that the craters were not intentionally created for the purpose of insurance fraud.

Figure 7:
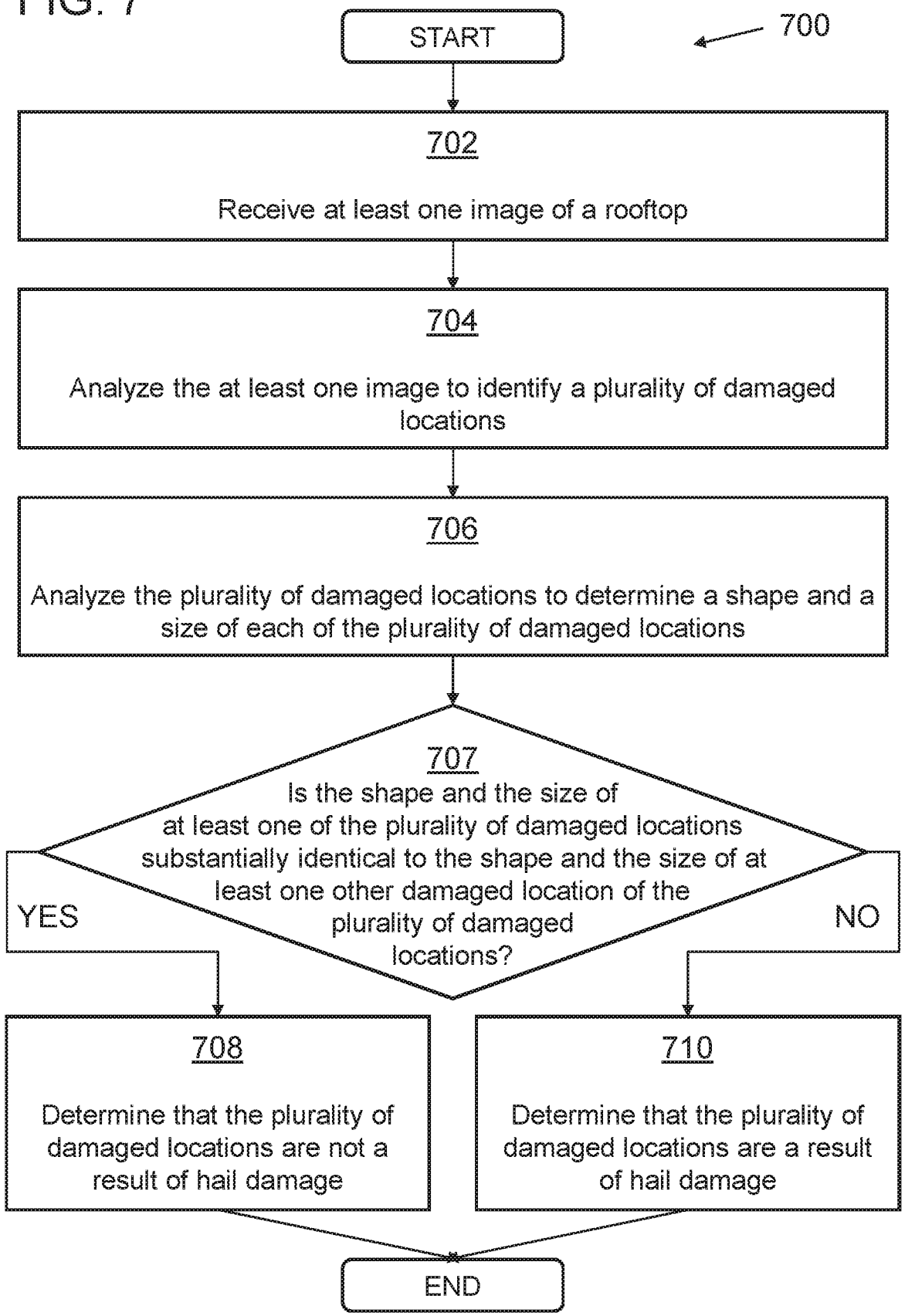
FIG. 7 illustrates a flowchart of another exemplary computer-implemented process implemented by the computer system shown in FIG. 1 for hail damage verification and/or hail fraud detection.

FIG. 7 illustrates a flowchart of another exemplary computer-implemented process 700 implemented by computer system 100 (shown in FIG. 1) for hail damage verification and/or hail fraud detection using computer vision and artificial intelligence. Accordingly, in one exemplary embodiment, system 100 (e.g., client device 102, system web server 106 and/or database server 108) may receive at least one image of a rooftop, such as rooftop 400 and/or rooftop 500 (step 702). The image may be received from drone 122 via network 104.

System 100 may, in addition, analyze the at least one image of rooftop 400 and/or rooftop 500 to identify a plurality of damaged locations, such as, for example, a plurality of craters (step 704). For example, system 100 may analyze an image of rooftop 400 to identify craters 402, 404, and/or 406. Likewise, system 100 may analyze an image of rooftop 500 to identify craters 502, 504, and/or 506. The plurality of craters may be identified based upon an image recognition process, with may be implemented by way of a computer vision algorithm and/or via an artificial intelligence operating on system 100.

To determine whether the plurality of craters are a result of (fraudulent) mechanical damage or whether they are naturally occurring as a result of hail (verified as hail damage), system 100 may analyze the plurality of craters to determine a shape, a size, a depth, and/or any other dimensional data associated with each of the plurality of craters (step 706). Based upon the analysis, system 100 may determine whether the shape and the size of at least one of the plurality of craters is substantially identical to the shape and the size of at least one other crater (step 707). Where the shape, size, and/or depth of at least one of the plurality of craters is substantially identical to the shape, size, and/or depth of at least one other crater, system 100 may determine that the craters were created as a result of mechanical damage to the rooftop (step 708). In other words, system 100 may, as a result, determine that the craters were intentionally created for the purpose of insurance fraud.

On the other hand, where the shape, size, and/or depth of at least one of the plurality of craters is not substantially identical to the shape, size, and/or depth of at least one other crater, system 100 may determine that the craters were not created as a result of mechanical damage to the rooftop (step 710). In other words, system 100 may, as a result, determine that the craters were not intentionally created for the purpose of insurance fraud but that the craters are naturally occurring as a result of hail.

Figure 8:
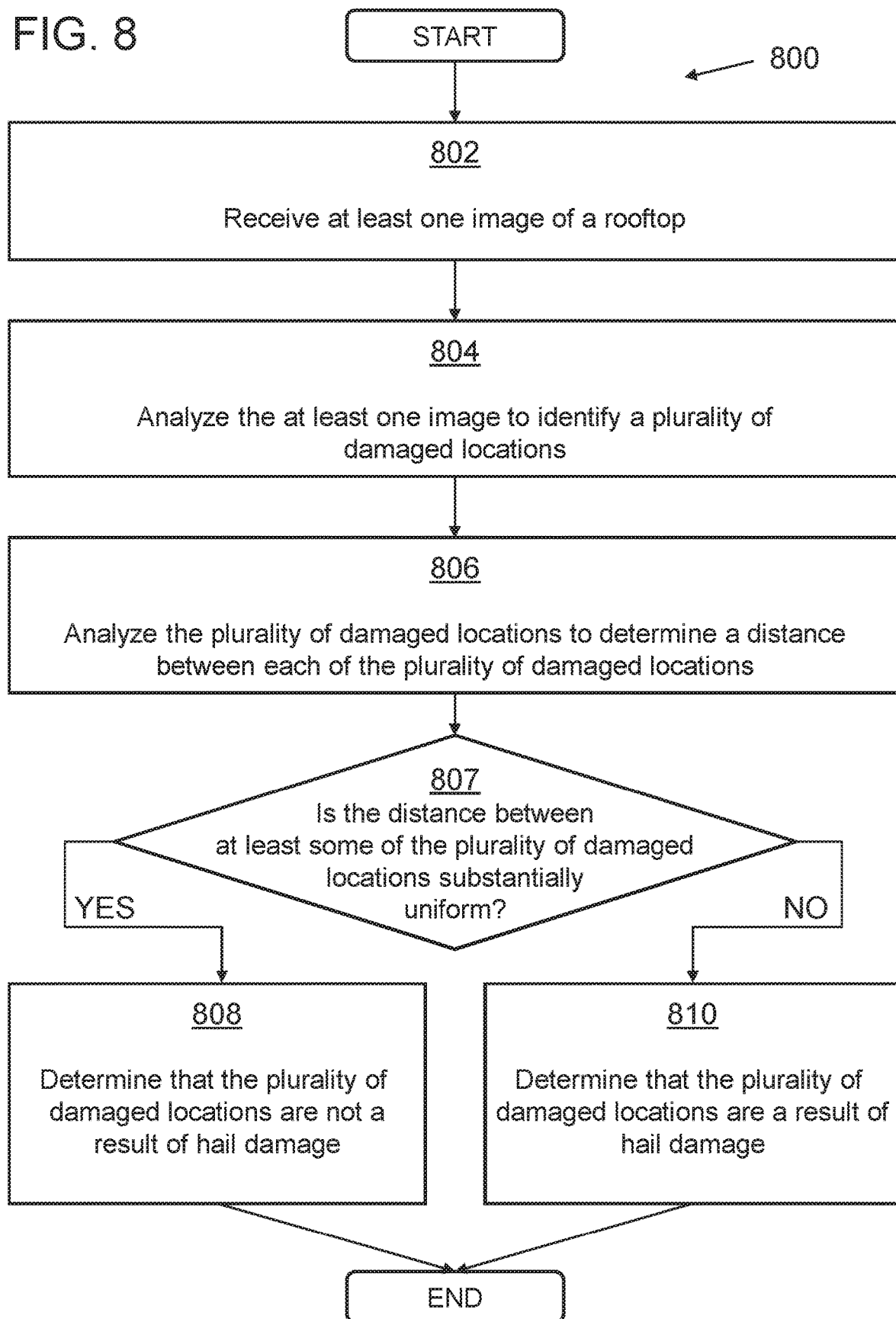
FIG. 8 illustrates a flowchart of another exemplary computer-implemented process implemented by the computer system shown in FIG. 1 for hail damage verification and/or hail fraud detection.

FIG. 8 illustrates a flowchart of another exemplary computer-implemented process 800 implemented by computer system 100 (shown in FIG. 1) for hail damage verification and/or hail fraud detection using computer vision and artificial intelligence. Accordingly, in an exemplary embodiment, system 100 (e.g., client device 102, system web server 106 and/or database server 108) may receive at least one image of a rooftop, such as rooftop 400 and/or rooftop 500 (step 802). The image may be received from drone 122 via network 104.

System 100 may, in addition, analyze the at least one image of rooftop 400 and/or rooftop 500 to identify a plurality of damaged locations, such as, for example, a plurality of craters (step 804). For example, system 100 may analyze an image of rooftop 400 to identify craters 402, 404, and/or 406. Likewise, system 100 may analyze an image of rooftop 500 to identify craters 502, 504, and/or 506. The plurality of craters may be identified based upon an image recognition process, with may be implemented by way of a computer vision algorithm and/or via an artificial intelligence operating on system 100.

To determine whether the plurality of craters are a result of (fraudulent) mechanical damage or whether they are naturally occurring as a result of hail, system 100 may analyze the plurality of craters to determine a distance or spacing between at least some of the plurality of craters (step 806). Based upon the analysis, system 100 may determine whether the distance or spacing between at least some of the plurality of craters is substantially uniform (e.g., whether the distances between craters is roughly equal) (step 807). Where the spacing or distances between at least some of the plurality of craters is substantially uniform, system 100 may determine that the craters were created as a result of mechanical damage to the rooftop (step 808). In other words, system 100 may, as a result, determine that the craters were intentionally created for the purpose of insurance fraud.

On the other hand, where the spacing or distances between at least some of the plurality of craters is substantially uniform, system 100 may determine that the craters were not created as a result of mechanical damage to the rooftop (step 810). In other words, system 100 may, as a result, determine that the craters were not intentionally created for the purpose of insurance fraud but that the craters are naturally occurring as a result of hail.

Figure 9:
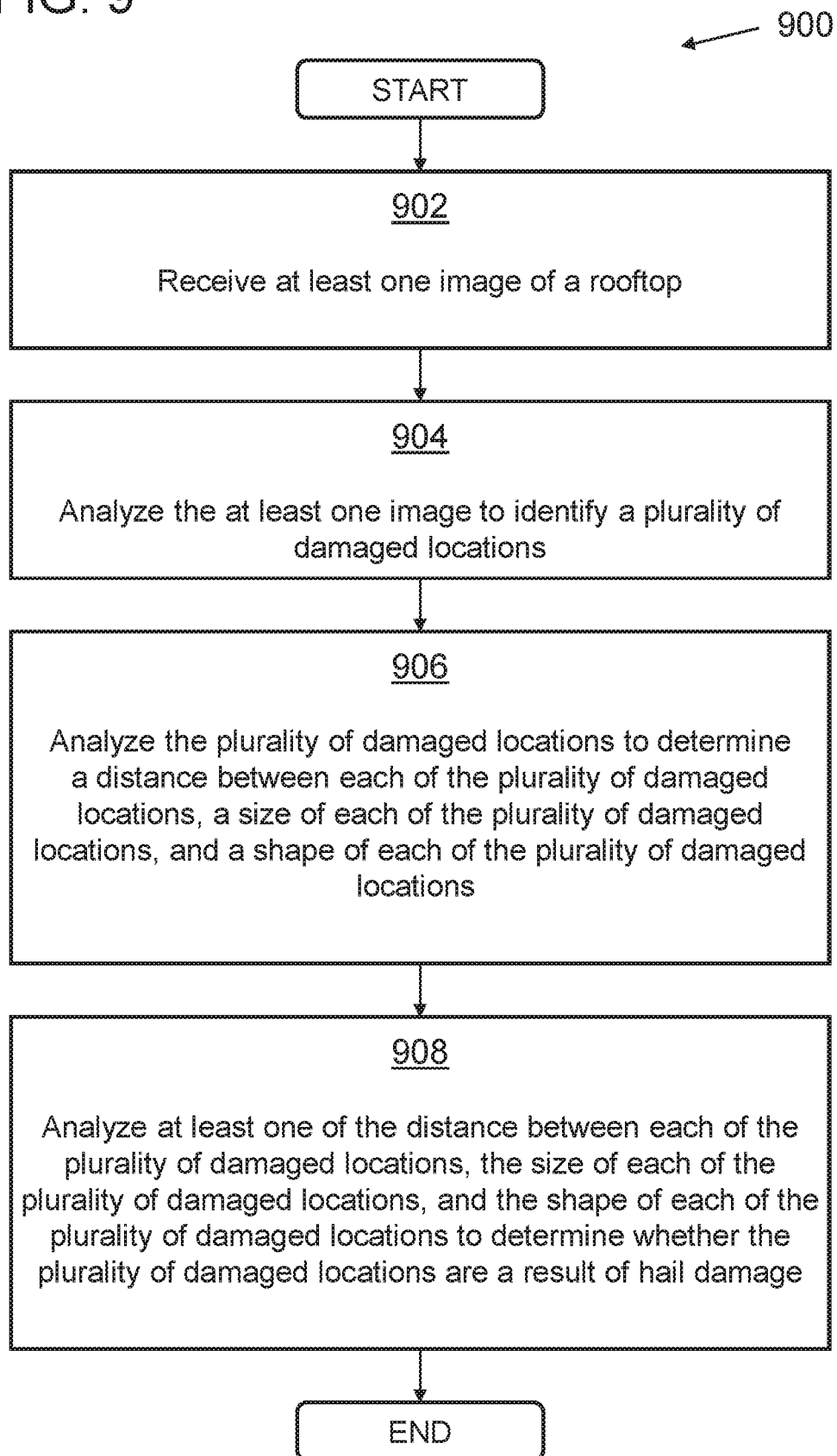
FIG. 9 illustrates a flowchart of another exemplary computer-implemented process implemented by the computer system shown in FIG. 1 for hail damage verification and/or hail fraud detection.

FIG. 9 illustrates a flowchart of another exemplary computer-implemented process 900 implemented by computer system 100 (shown in FIG. 1) for hail damage verification and/or hail fraud detection using computer vision and artificial intelligence. Accordingly, in one exemplary embodiment, system 100 (e.g., client device 102, system web server 106 and/or database server 108) may receive at least one image of a rooftop, such as rooftop 400 and/or rooftop 500 (step 902). The image may be received from drone 122 via network 104.

System 100 may, in addition, analyze the at least one image of rooftop 400 and/or rooftop 500 to identify a plurality of damaged locations, such as, for example, a plurality of craters (step 904). For example, system 100 may analyze an image of rooftop 400 to identify craters 402, 404, and/or 406. Likewise, system 100 may analyze an image of rooftop 500 to identify craters 502, 504, and/or 506. The plurality of craters may be identified based upon an image recognition process, with may be implemented by way of a computer vision algorithm and/or via an artificial intelligence operating on system 100.

To determine whether the plurality of craters are a result of (fraudulent) mechanical damage or whether they are naturally occurring as a result of hail, system 100 may analyze the plurality of craters to determine a shape, a size, a depth, and/or any other dimensional data associated with each of the plurality of craters and/or a distance or spacing between each of the plurality of craters (step 906). Based upon the analysis, system 100 may determine whether the shape, size, and/or depth of at least one of the plurality of craters is substantially identical to the shape, size, and/or depth of at least one other crater (step 908).

Where the shape, size, and/or depth of at least one of the plurality of craters is substantially identical to the shape, size, and/or depth of at least one other crater, system 100 may determine that the craters were created as a result of mechanical damage to the rooftop. Similarly, where the spacing between craters is substantially uniform, system 100 may determine that the craters were created as a result of mechanical damage to the rooftop. On the other hand, where the shape, size, and/or depth of at least one of the plurality of craters is not substantially identical to the shape, size, and/or depth of at least one other crater (i.e., anomalies or differences exist), system 100 may determine that the craters were not created as a result of mechanical damage to the rooftop. Similarly, where the spacing between craters is not substantially uniform, system 100 may determine that the craters were not created as a result of mechanical damage to the rooftop.

Exemplary Embodiments & Functionality

In one aspect, a computer system for verifying hail damage and/or detecting hail fraud may be provided. In some exemplary embodiments, the system includes a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing the plurality of damaged locations to determine a shape and a size of each of the plurality of damaged locations; and/or (iv) at least one of: (a) determining, based upon the analyzing, that the shape and the size of at least one of the plurality of damaged locations is substantially identical to the shape and the size of at least one other damaged location of the plurality of damaged locations to determine that the plurality of damaged locations are not a result of hail damage; or (b) determining, based upon the analyzing, that the shape and the size of at least one of the plurality of damaged locations is not substantially identical to the shape and the size of at least one other damaged location of the plurality of damaged locations to determine that the plurality of damaged locations are a result of hail damage. The system may include additional, less, or alternate functionality, including that discussed elsewhere herein.

In another aspect, a computer system for verifying hail damage and/or detecting hail fraud may be provided. In some exemplary embodiments, the system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing the plurality of damaged locations to determine a distance between each of the plurality of damaged locations; and/or (iv) at least one of: (a) determining, based upon the analyzing, that the distance between at least some of the plurality of damaged locations is substantially uniform to determine that the plurality of damaged locations are not a result of hail damage; or (b) determining, based upon the analyzing, that the distance between at least some of the plurality of damaged locations is not substantially uniform to determine that the plurality of damaged locations are a result of hail damage. The system may include additional, less, or alternate functionality, including that discussed elsewhere herein.

In another aspect, a computer system for verifying hail damage and/or detecting hail fraud may be provided. In some exemplary embodiments, the system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; (iii) analyzing the plurality of damaged locations to determine a distance between each of the plurality of damaged locations, a size of each of the plurality of damaged locations, and a shape of each of the plurality of damaged locations; and/or (iv) analyzing at least one of the distance between each of the plurality of damaged locations, the size of each of the plurality of damaged locations, and the shape of each of the plurality of damaged locations to determine whether the plurality of damaged locations are a result of hail damage. The system may include additional, less, or alternate functionality, including that discussed elsewhere herein.

In another aspect, a computer system for verifying hail damage and/or detecting hail fraud may be provided. In some exemplary embodiments, the system may include a processor and a non-transitory, tangible, computer-readable storage medium having instructions stored thereon that, in response to execution by the processor, cause the processor to perform operations including: (i) receiving at least one image of at least a portion of a rooftop; (ii) analyzing the at least one image to identify a plurality of damaged locations; and/or (iii) comparing the plurality of damaged locations to each other to determine whether the plurality of damaged locations are a result of hail damage. The system may include additional, less, or alternate functionality, including that discussed elsewhere herein.

In yet another aspect, a computer-implemented method for verifying hail damage and/or hail fraud detection is provided. The method may include: (i) receiving, by a processor, at least one image of at least a portion of a rooftop; (ii) analyzing, by the processor, the at least one image to identify a plurality of damaged locations; and/or (iii) comparing, by the processor, the plurality of damaged locations to each other to determine whether the plurality of damaged locations are a result of hail damage. The method may include additional, less, or alternate actions, including those discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns and/or anomalies in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs. The data input may include data or images related to actual hail damage, hail damage anomalies, mechanical damage, and/or images from drones, mobile devices, or land-based rovers. The data may also include smart or autonomous vehicle and/or intelligent home data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Exemplary Hail Fraud Detection Capability on Composite Roofs Using Computer Vision and Artificial Intelligence Insurance providers may spend resources and potentially pay claims it does not owe on insurance fraud with regard to hail damage. Detecting fraudulent damage is time consuming to do manually. The present embodiments provide a computer-implemented method to detect mechanical damage (damage caused intentionally with force and/or a device of some type) that indicates the presence of fraud on a composite (i.e., asphalt shingle) roof by analyzing pictures of the roof with computer vision and artificial intelligence. This may be done by collecting imagery of a roof from a reasonable distance (either from the roof or with a device to get above the roof—pole, drone, etc.) and developing classifiers to be used to analyze the images using the methods listed below.

A. Comparing Anomaly Impact Signatures

Hail may be random in size, shape (round and smooth versus bumpy or sharp edges), density, and weight. All of these factors contribute to variation in impact signatures across the population of samples of a given roof after a hail storm. Therefore, if one analyzes the anomalies' impact signatures and finds enough similarity in them this may be an indicator of mechanical damage. Put another way, the lack of variation in impact signatures may indicate mechanical damage. For example, if a leaning stick is used to create mechanical damage, all of the impact craters may look similar at the pixel level even if there is variation in the amount of force used. The craters simply will lack enough variation among themselves.

B. Looking for Patterns of Anomaly Placement Across the Slope of a Roof

Patterns may emerge when analyzing what seem to be hail anomalies due to factors such as using the same hand to swing a hammer or other device. The impacts may have patterns of distance, arching, etc. due to the limited length of one's arm, swing pattern, etc. Patterns may also emerge when analyzing what seem to be hail anomalies due to the direction the person is moving across the roof. For instance, if a person is using a leaning stick or hammer to make impact marks, not only will their impact signatures look similar as described above, there is potential the impact angle will be the same across one slope. If they worked from, say, east to west on one slope, then crossed the ridge to the opposite slope and worked their way west to east, the impact signatures would likely be at opposite angles. This opposite angle effect is different from what would be expected from hail that would all come from the same direction due to wind resulting in all impacts being at the same angle.

C. Looking for Damage Anomalies in Suspect Areas of the Roof

When hail affects an insured home it is very likely that the entire area of the roof exposed to the direction the wind is driving the hail would sustain damage. Therefore, finding damage clusters confined to easy to reach places may indicate mechanical damage. For example, a valley is an easy place to climb on a roof. If there are instance of damage within a reasonable distance (indicating the length of reach of a person) but not farther out where hail would be expected, this may indicate mechanical damage. Another example is along the length of a slope but not farther up than can be reached from a ladder.

D. Looking for the Absence of Anomalies where they would be Expected

When hail affects an insured home, it is very likely that if the roof material, i.e., shingles, is damage there will be other indicators of hail damage on other materials, objects, etc. For example, if there is shingle damage, then there are other appurtenances on the roof that would be expected to be damaged, such as chimney vents, roof vents, valley tin, drip edge, gutters, etc. There is also potential for hail damage on other items and structures, such as A/C condenser housings, fence, shed or other out building, etc. Finding an absence of hail damage on these other candidates for damage may be an indication that the damage to the roof was caused intentionally and confined to the shingles. Alternatively, finding hail damage on these other candidates may be an indication of actual hail damage.

E. Exemplary Computer-Implemented Method

Figure 10:
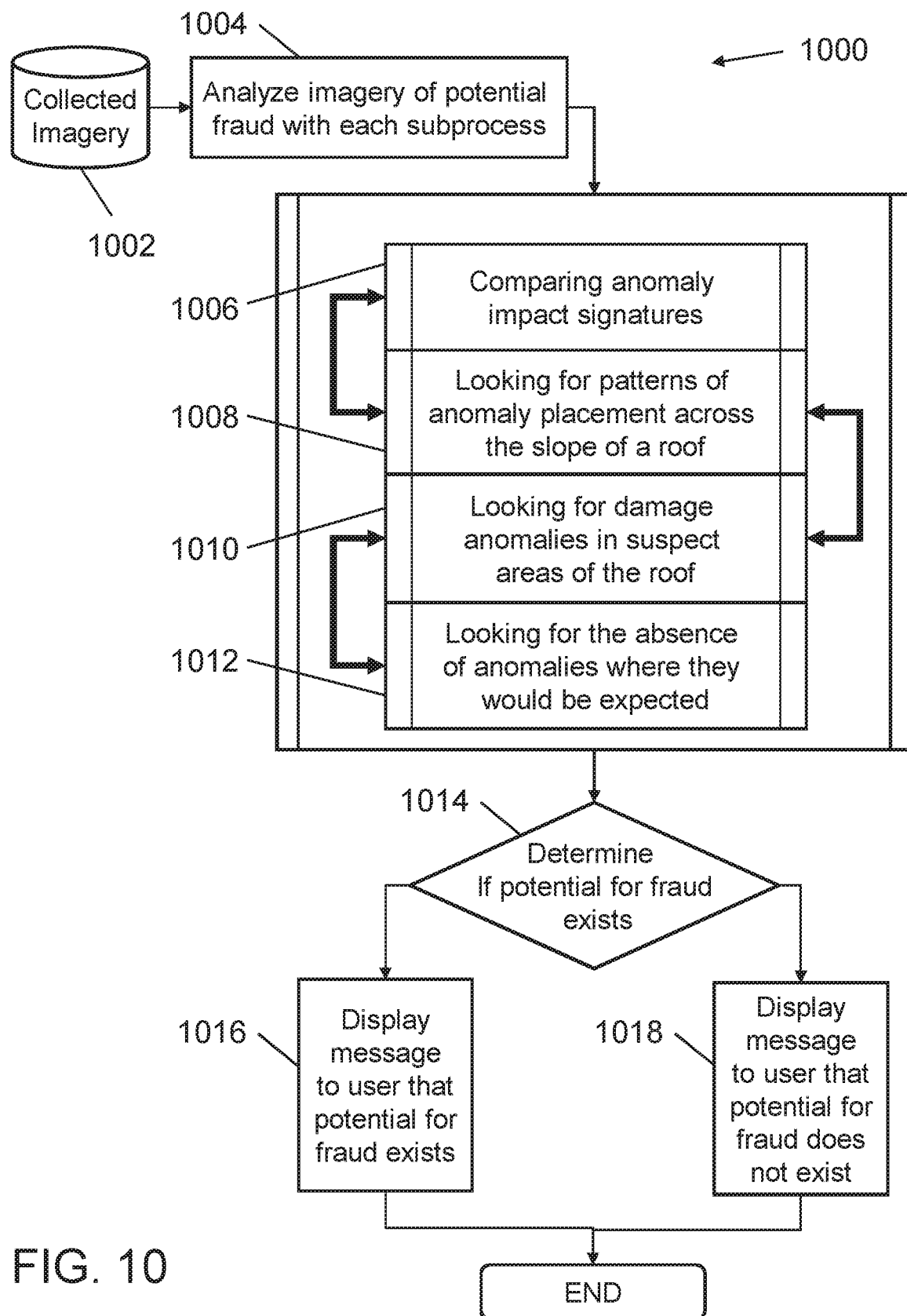
FIG. 10 illustrates a flowchart of another exemplary computer-implemented process implemented by the computer system shown in FIG. 1 for hail damage verification and/or hail fraud detection.

FIG. 10 illustrates a flowchart of another exemplary computer-implemented method for hail damage verification and/or hail fraud detection 1000. The method 1000 may include, via one or more processors and/or transceivers, collecting images and/or image data of a roof and/or house 1002, and analyzing the imagery to verify actual hail damage or flag for potential fraud 1004. The method 1000 may include, via the one or more processors, comparing anomaly impact signatures 1006, looking or analyzing for patterns of anomaly placement across the slope of a roof 1008, looking or analyzing for damage anomalies in suspect areas of the roof 1010, and/or looking or analyzing for the absence of anomalies where they would be expected 1012. The method 1000 may include, via the one or more processors and/or associated transceivers, determining if actual hail damage or alternatively the potential for fraud exists 1014, displaying a message that potential fraud exists 1016 or that potential fraud does not exist or actual hail damage exists 1018. The method may include additional, less, or alternate actions, including those discussed elsewhere herein.

Additional Embodiments

In one aspect, a computer system for verifying hail damage using computer vision and/or artificial intelligence. The computer system may include a processor; an associated transceiver; and a non-transitory, tangible, computer-readable storage medium having instructions stored thereon that, in response to execution by the processor, cause the processor and/or associated transceiver to perform operations comprising: (1) receiving (via wired communication, and/or wireless communication or data transmission over one or more radio frequency links or communication channels) or retrieving images or image data of two or more impact signatures or craters in roofing material of a roof of a building; (2) analyzing the images or image data to determine whether one or more anomalies exist among the two or more impact signatures or craters in the roofing material; (3) if one or more anomalies exist among the two or more impact signatures, generating an electronic message indicating that the actual hail damage exists in the roofing material or that the damaged locations in the roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage.

The images or image data may be acquired by and received from a remote-controlled or autonomous aerial drone equipped with a camera, or from a remote-controlled or autonomous rover equipped with a camera and/or any other suitable image capture device. One or more anomalies may be determined to exist among the two or more impact signatures or craters in the roofing material when the two or more impact signatures or craters are of different size or shape, and/or are spaced apart at different distances, or spaced different distances apart. Additionally or alternatively, one or more anomalies are determined to exist among the two or more impact signatures or craters in the roofing material when the two or more impact signatures or craters have different depths, and/or have different indentation distances. The system may include additional, less, or alternate functionality, including that discussed elsewhere herein.

In another aspect, a computer system for verifying hail damage using computer vision and/or artificial intelligence may be provided. The computer system may include a processor and an associated transceiver; and a non-transitory, tangible, computer-readable storage medium having instructions stored thereon that, in response to execution by the processor, cause the processor and/or associated transceiver to perform operations comprising: (1) receiving or retrieving images or image data of two or more impact signatures or craters in roofing material of a roof of a building; (2) analyzing the images or image data to determine whether one or more anomalies exist among the two or more impact signatures or craters in the roofing material; (3) if no anomalies exist among the two or more impact signatures, generating an electronic message indicating that the no actual hail damage may exist in the roofing material or that the damaged locations in the roofing material are potentially a result of mechanical damage; and/or (4) transmitting, via wired communication, and/or wireless communication or data transmission over one or more radio frequency links or communication channels, the electronic message to an inspector's mobile device to facilitate further investigating of the damaged roofing material to promptly resolve insurance claims. The system may include additional, less, or alternate functionality, including that discussed elsewhere herein.

In another aspect, a computer system for verifying hail damage using computer vision and/or artificial intelligence may be provided. The computer system may include a processor; a transceiver; and a non-transitory, tangible, computer-readable storage medium having instructions stored thereon that, in response to execution by the processor, cause the processor and/or transceiver to perform operations comprising: (1) receiving or retrieve images or image data of two or more impact signatures or craters in roofing material of a roof of a building; (2) analyzing the images or image data to identify an anomaly among the two or more impact signatures or craters in the roofing material; (3) if one or more anomalies exist among the two or more impact signatures, generating an electronic message indicating that the actual hail damage exists in the roofing material or that the damaged locations in the roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage. The system may include additional, less, or alternate functionality, including that discussed elsewhere herein.

In another aspect, a computer system for verifying hail damage and/or detecting hail fraud using computer vision and artificial intelligence may be provided. The computer system may include a processor; an associated transceiver; and a non-transitory, tangible, computer-readable storage medium having instructions stored thereon that, in response to execution by the processor, cause the processor and/or associated transceiver to perform operations comprising: (1) receiving at least one image of at least a portion of a rooftop; (2) analyzing the at least one image to identify a plurality of damaged locations; (3) analyzing the plurality of damaged locations to determine one or more anomalies among the plurality of damaged locations; (4) if one or more anomalies exist among the plurality of damaged locations, generating an electronic message indicating that the actual hail damage exists in the roofing material or that the damaged locations in the roofing material are a result of hail damage; and/or (5) transmitting, via wired communication, and/or wireless communication or data transmission over one or more radio frequency links or communication channels, the electronic message to a user mobile device or other computing device to facilitate handling and promptly resolving insurance claims caused by hail damage. The system may include additional, less, or alternate functionality, including that discussed elsewhere herein.

In another aspect, a computer-implemented method for verifying hail damage using computer vision and/or artificial intelligence may be provided. The method may include, via one or more processors and/or associated transceivers: (1) receiving (via wired communication, and/or wireless communication or data transmission over one or more radio frequency links or communication channels) or retrieving images or image data of two or more impact signatures or craters in roofing material of a roof of a building; (2) analyzing the images or image data to determine whether one or more anomalies exist among the two or more impact signatures or craters in the roofing material; (3) if one or more anomalies exist among the two or more impact signatures, generating an electronic message indicating that the actual hail damage exists in the roofing material or that the damaged locations in the roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage. The method may include additional, less, or alternate actions, including those discussed elsewhere herein.

In another aspect, a computer-implemented method for verifying hail damage using computer vision and/or artificial intelligence may be provided. The method may include, via one or more processors and/or transceivers: (1) receiving or retrieving images or image data of two or more impact signatures or craters in roofing material of a roof of a building; (2) analyzing the images or image data to determine whether one or more anomalies exist among the two or more impact signatures or craters in the roofing material; (3) if no anomalies exist among the two or more impact signatures, generating an electronic message indicating that the no actual hail damage may exist in the roofing material or that the damaged locations in the roofing material are potentially a result of mechanical damage; and/or (4) transmitting, via wired communication, and/or wireless communication or data transmission over one or more radio frequency links or communication channels, the electronic message to an inspector's mobile device to facilitate further investigating of the damaged roofing material to promptly resolve insurance claims. The method may include additional, less, or alternate actions, including those discussed elsewhere herein.

In another aspect, a computer-implemented method for verifying hail damage using computer vision and/or artificial intelligence may be provided. The method may include, via one or more processors and/or associated transceivers: (1) receiving or retrieving images or image data of two or more impact signatures or craters in roofing material of a roof of a building; (2) analyzing the images or image data to identify an anomaly among the two or more impact signatures or craters in the roofing material; (3) if one or more anomalies exist among the two or more impact signatures, generating an electronic message indicating that the actual hail damage exists in the roofing material or that the damaged locations in the roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage. The method may include additional, less, or alternate actions, including those discussed elsewhere herein.

In another aspect, a computer-implemented method for verifying hail damage and/or detecting hail fraud using computer vision and artificial intelligence may be provided. The method may include, via one or more processors and/or associated transceivers: (1) receiving at least one image of at least a portion of a rooftop; analyzing the at least one image to identify a plurality of damaged locations; (2) analyzing the plurality of damaged locations to determine one or more anomalies among the plurality of damaged locations; (3) if one or more anomalies exist among the plurality of damaged locations, generating an electronic message indicating that the actual hail damage exists in the roofing material or that the damaged locations in the roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage. The method may include additional, less, or alternate actions, including those discussed elsewhere herein.

In another aspect, a computer system for verifying hail damage using computer vision and/or artificial intelligence may be provided. The computer system may include a processor; an associated transceiver; and a non-transitory, tangible, computer-readable storage medium having instructions stored thereon that, in response to execution by the processor, cause the processor and/or associated transceiver to perform operations comprising: (1) receiving (via wired communication, and/or wireless communication or data transmission over one or more radio frequency links or communication channels) an indication of an insurance claim for hail damage associated with a property; (2) receiving (via wired communication, and/or wireless communication or data transmission over one or more radio frequency links or communication channels) or retrieving images or image data of non-roofing material portions of a roof of the property; (3) analyzing the images or image data to determine whether one or more anomalies exist among the non-roofing material portions of a roof; (4) if one or more anomalies exist among the non-roofing material portions of a roof, generating an electronic message indicating that the actual hail damage exists at the property or that the damaged locations in roofing material are a result of hail damage; and/or (5) transmitting, via wired communication, and/or wireless communication or data transmission over one or more radio frequency links or communication channels, the electronic message to a user mobile device or other computing device to facilitate handling and promptly resolving insurance claims caused by hail damage. The system may include additional, less, or alternate functionality, including that discussed elsewhere herein.

In another aspect, a computer system for verifying hail damage using computer vision and/or artificial intelligence may be provided. The computer system may include a processor; a transceiver; and a non-transitory, tangible, computer-readable storage medium having instructions stored thereon that, in response to execution by the processor, cause the processor and/or transceiver to perform operations comprising: (1) receiving or retrieve images or image data of two or more impact signatures or craters in non-roofing material of a roof of a building; (2) analyzing the images or image data to identify an anomaly among the two or more impact signatures or craters in the non-roofing material; (3) if one or more anomalies exist among the two or more impact signatures, generating an electronic message indicating that the actual hail damage exists to the roof or that the damaged locations in the non-roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage. The system may include additional, less, or alternate functionality, including that discussed elsewhere herein.

In another aspect, a computer system for verifying hail damage and/or detecting hail fraud using computer vision and artificial intelligence may be provided. The computer system may include a processor; an associated transceiver; and a non-transitory, tangible, computer-readable storage medium having instructions stored thereon that, in response to execution by the processor, cause the processor and/or associated transceiver to perform operations comprising: (1) receiving at least one image of at least a non-roofing material portion of a rooftop; (2) analyzing the at least one image to identify a plurality of damaged locations; (3) analyzing the plurality of damaged locations to determine one or more anomalies among the plurality of damaged locations; (4) if one or more anomalies exist among the plurality of damaged locations, generating an electronic message indicating that the actual hail damage exists to the roof or that the damaged locations in the non-roofing material are a result of hail damage; and/or (5) transmitting, via wired communication, and/or wireless communication or data transmission over one or more radio frequency links or communication channels, the electronic message to a user mobile device or other computing device to facilitate handling and promptly resolving insurance claims caused by hail damage. The system may include additional, less, or alternate functionality, including that discussed elsewhere herein.

In another aspect, a computer-implemented method for verifying hail damage using computer vision and/or artificial intelligence may be provided. The method comprising, via one or more processors and/or associated transceivers: (1) receiving (via wired communication, and/or wireless communication or data transmission over one or more radio frequency links or communication channels) an indication of an insurance claim for hail damage associated with a property; (2) receiving (via wired communication, and/or wireless communication or data transmission over one or more radio frequency links or communication channels) or retrieving images or image data of non-roofing material portions of a roof of the property; (3) analyzing the images or image data to determine whether one or more anomalies exist among the non-roofing material portions of a roof; (4) if one or more anomalies exist among the non-roofing material portions of a roof, generating an electronic message indicating that the actual hail damage exists at the property or that the damaged locations in roofing material are a result of hail damage; and/or (5) transmitting, via wired communication, and/or wireless communication or data transmission over one or more radio frequency links or communication channels, the electronic message to a user mobile device or other computing device to facilitate handling and promptly resolving insurance claims caused by hail damage. The method may include additional, less, or alternate actions, including those discussed elsewhere herein.

In another aspect, a computer-implemented method for verifying hail damage using computer vision and/or artificial intelligence may be provided. The method may include, via one or more processors: (1) receiving or retrieve images or image data of two or more impact signatures or craters in non-roofing material of a roof of a building; (2) analyzing the images or image data to identify an anomaly among the two or more impact signatures or craters in the non-roofing material; (3) if one or more anomalies exist among the two or more impact signatures, generating an electronic message indicating that the actual hail damage exists to the roof or that the damaged locations in the non-roofing material are a result of hail damage; and/or (4) transmitting, via wired communication, and/or wireless communication or data transmission over one or more radio frequency links or communication channels, the electronic message to a user mobile device or other computing device to facilitate handling and promptly resolving insurance claims caused by hail damage. The method may include additional, less, or alternate actions, including those discussed elsewhere herein.

In another aspect, a computer-implemented method for verifying hail damage and/or detecting hail fraud using computer vision and artificial intelligence may be provided. The method may include, via one or more processors and/or transceivers: (1) receiving at least one image of at least a non-roofing material portion of a rooftop; (2) analyzing the at least one image to identify a plurality of damaged locations; (3) analyzing the plurality of damaged locations to determine one or more anomalies among the plurality of damaged locations; (4) if one or more anomalies exist among the plurality of damaged locations, generating an electronic message indicating that the actual hail damage exists to the roof or that the damaged locations in the non-roofing material are a result of hail damage; and/or (5) transmitting, via wired communication, and/or wireless communication or data transmission over one or more radio frequency links or communication channels, the electronic message to a user mobile device or other computing device to facilitate handling and promptly resolving insurance claims caused by hail damage. The method may include additional, less, or alternate actions, including those discussed elsewhere herein.

In another aspect, a computer-implemented method for verifying hail damage and/or detecting hail fraud using computer vision and artificial intelligence may be provided. The method may be implemented using one or more processors and/or transceivers. The method may include: (1) receiving at least one image of at least a portion of a rooftop; (2) analyzing the at least one image to identify a plurality of damaged locations; (3) analyzing the plurality of damaged locations to determine a shape and a size of each of the plurality of damaged locations; and (4) at least one of: (a) determining, based upon the analyzing, that the shape and the size of at least one of the plurality of damaged locations is substantially identical to the shape and the size of at least one other damaged location of the plurality of damaged locations to determine that the plurality of damaged locations are not a result of hail damage; or (b) determining, based upon the analyzing, that the shape and the size of at least one of the plurality of damaged locations is not substantially identical to the shape and the size of at least one other damaged location of the plurality of damaged locations to determine that the plurality of damaged locations are a result of hail damage. The method may include additional, less, or alternate actions, including those discussed elsewhere herein.

In another aspect, a computer-implemented method for verifying hail damage and/or detecting hail fraud using computer vision and artificial intelligence may be provided. The method may be implemented using one or more processors and/or transceivers. The method may include: (1) receiving at least one image of at least a portion of a rooftop; (2) analyzing the at least one image to identify a plurality of damaged locations; (3) analyzing the plurality of damaged locations to determine a distance between each of the plurality of damaged locations; and (4) at least one of: (a) determining, based upon the analyzing, that the distance between at least some of the plurality of damaged locations is substantially uniform to determine that the plurality of damaged locations are not a result of hail damage; or (b) determining, based upon the analyzing, that the distance between at least some of the plurality of damaged locations is not substantially uniform to determine that the plurality of damaged locations are a result of hail damage. The method may include additional, less, or alternate actions, including those discussed elsewhere herein.

In another aspect, a computer-implemented method for verifying hail damage and/or detecting hail fraud using computer vision and artificial intelligence may be provided. The method may be implemented using one or more processors and/or transceivers. The method may include: (1) receiving at least one image of at least a portion of a rooftop; (2) analyzing the at least one image to identify a plurality of damaged locations; (3) analyzing the plurality of damaged locations to determine a distance between each of the plurality of damaged locations, a size of each of the plurality of damaged locations, and a shape of each of the plurality of damaged locations; and (4) analyzing at least one of the distance between each of the plurality of damaged locations, the size of each of the plurality of damaged locations, and the shape of each of the plurality of damaged locations to determine whether the plurality of damaged locations are a result of actual hail damage. The method may include additional, less, or alternate actions, including those discussed elsewhere herein.

The foregoing computer-implemented methods and other computer-implemented methods discussed herein may be implemented via various computer systems, including those discussed herein. The computer systems may have one or more local or remote processors, servers, sensors, and/or transceivers. The methods may also be implemented via non-transitory computer-readable medium or media having processor executable instructions stored thereon that direct one or more processors to carry out the functionality or actions carried out by the methods.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer system for verifying hail damage using computer vision and artificial intelligence, the computer system comprising:

a processor; and a non-transitory, tangible, computer-readable storage medium having instructions stored thereon that, in response to execution by the processor, cause the processor to perform operations comprising:

receiving at least one image of at least a portion of a single rooftop;

analyzing the at least one image to identify a selected damage area on the single rooftop, the selected damage area including a plurality of damaged locations including a first damaged location and a second damaged location;

analyzing, using at least one of a computer vision and an artificial intelligence algorithm, the first damaged location of the plurality of damaged locations to determine a shape and a size of the first damaged location of the plurality of damaged locations;

analyzing, using the at least one of the computer vision and the artificial intelligence algorithm, the second damaged location of the plurality of damaged locations to determine a shape and size of the second damaged location of the plurality of damaged locations;

comparing, based upon the analysis, the shape and the size of the first damaged location to the shape and the size of the second damaged location; and determining, based upon the comparison, whether the plurality of damaged locations are a result of hail damage.

2. The computer system of claim 1, wherein the processor is further configured to perform operations comprising:

determining that the plurality of damaged locations are not the result of hail damage when the shape and the size of the first damaged location of the plurality of damaged locations are substantially identical to the shape and the size of the second damaged location of the plurality of damaged locations; and determining that the plurality of damaged locations are the result of hail damage when the shape and the size of the first damaged location of the plurality of damaged locations are not substantially identical to the shape and the size of the second damaged location of the plurality of damaged locations.

3. The computer system of claim 1, wherein the processor is further configured to perform operations comprising analyzing the plurality of damaged locations to determine a distance between each of the plurality of damaged locations.

4. The computer system of claim 3, wherein the processor is further configured to perform operations comprising determining, based upon the analyzing, that the plurality of damaged locations are not a result of hail damage based upon the distance between at least some of the plurality of damaged locations being substantially uniform.

5. The computer system of claim 4, wherein the processor is further configured to perform operations comprising determining that the plurality of damaged locations are a result of mechanical damage delivered by an individual.

6. The computer system of claim 3, wherein the processor is further configured to perform operations comprising determining, based upon the analyzing, that the plurality of damaged locations are a result of hail damage based upon the distance between at least some of the plurality of damaged locations being not substantially uniform.

7. The computer system of claim 1, wherein analyzing the plurality of damaged locations using an artificial intelligence algorithm comprises implementing a machine learning algorithm to compare the plurality of damaged locations to a plurality of patterns and shapes associated with known hail damage.

8. The computer system of claim 1, wherein analyzing the plurality of damaged locations using a computer vision algorithm comprises implementing an image recognition algorithm to identify variations in an impact signature of each of the plurality of damaged locations.

9. The computer system of claim 1, wherein at least one of the shape and the size of at least one of the plurality of damaged locations is associated with mechanical damage delivered by a tool.

10. The computer system of claim 1, wherein the processor is further configured to perform operations comprising receiving at least one image of a soft metal component mounted on the single rooftop.

11. The computer system of claim 10, wherein the processor is further configured to perform operations comprising analyzing the at least one image of the soft metal component to identify at least one damaged location in the soft metal component.

12. The computer system of claim 11, wherein the processor is further configured to perform operations comprising determining, in response to the analyzing, that the plurality of damaged locations in the soft metal component are a result of hail damage.

13. The computer system of claim 10, wherein the processor is further configured to perform operations comprising analyzing the at least one image of the soft metal component to determine that the soft metal component is undamaged.

14. The computer system of claim 13, wherein the processor is further configured to perform operations comprising determining, in response to the analyzing, that the plurality of damaged locations are not a result of hail damage.

15. A computer-implemented method for verifying hail damage using computer vision and artificial intelligence, the method implemented using a computer system including a processor in communication with at least one memory, the method comprising:

receiving at least one image of at least a portion of a single rooftop;

analyzing the at least one image to identify a selected damage area on the single rooftop, the selected damage area including a plurality of damaged locations including a first damaged location and a second damaged location;

analyzing, using at least one of a computer vision and an artificial intelligence algorithm, the first damaged location of the plurality of damaged locations to determine a shape and a size of the first damaged location of the plurality of damaged locations;

analyzing, using the at least one of the computer vision and the artificial intelligence algorithm, the second damaged location of the plurality of damaged locations to determine a shape and size of the second damaged location of the plurality of damaged locations;

comparing, based upon the analysis, the shape and the size of the first damaged location to the shape and the size of the second damaged location; and determining, based upon the comparison, whether the plurality of damaged locations are a result of hail damage.

16. The computer-implemented method of claim 15, wherein said determining comprises:

determining that the plurality of damaged locations are not the result of hail damage when the shape and the size of the first damaged location of the plurality of damaged locations are substantially identical to the shape and the size of the second damaged location of the plurality of damaged locations; and determining that the plurality of damaged locations are the result of hail damage when the shape and the size of the first damaged location of the plurality of damaged locations are not substantially identical to the shape and the size of the second damaged location of the plurality of damaged locations.

17. The computer-implemented method of claim 15 further comprising analyzing the plurality of damaged locations to determine a distance between each of the plurality of damaged locations.

18. The computer-implemented method of claim 17 further comprising determining, based upon the analyzing, that the plurality of damaged locations are not a result of hail damage based upon the distance between at least some of the plurality of damaged locations being substantially uniform.

19. The computer-implemented method of claim 17 further comprising determining, based upon the analyzing, that the plurality of damaged locations are a result of hail damage based upon the distance between at least some of the plurality of damaged locations being not substantially uniform.

20. The computer-implemented method of claim 15, wherein analyzing the plurality of damaged locations using an artificial intelligence algorithm comprises implementing a machine learning algorithm to compare the plurality of damaged locations to a plurality of patterns and shapes associated with known hail damage.

21. At least one non-transitory computer-readable storage media having computer-executable instructions embodied thereon, wherein when executed by a computer system including at least one processor in communication with a memory, the computer-executable instructions cause the at least one processor to perform operations comprising:
   receiving at least one image of at least a portion of a single rooftop;
   analyzing the at least one image to identify a selected damage area on the single rooftop, the selected damage area including a plurality of damaged locations including a first damaged location and a second damaged location;
   analyzing, using at least one of a computer vision and an artificial intelligence algorithm, the first damaged location of the plurality of damaged locations to determine a shape and a size of the first damaged location of the plurality of damaged locations;
   analyzing, using the at least one of the computer vision and the artificial intelligence algorithm, the second damaged location of the plurality of damaged locations to determine a shape and size of the second damaged location of the plurality of damaged locations;
   comparing, based upon the analysis, the shape and the size of the first damaged location to the shape and the size of the second damaged location; and
   determining, based upon the comparison, whether the plurality of damaged locations are a result of hail damage.

22. The at least one non-transitory computer-readable storage media of claim 21, wherein the computer-executable instructions cause the at least one processor to perform operations further comprising:
   determining that the plurality of damaged locations are not the result of hail damage when the shape and the size of the first damaged location of the plurality of damaged locations are substantially identical to the shape and the size of the second damaged location of the plurality of damaged locations; and
   determining that the plurality of damaged locations are the result of hail damage when the shape and the size of the first damaged location of the plurality of damaged locations are not substantially identical to the shape and the size of the second damaged location of the plurality of damaged locations.

23. The at least one non-transitory computer-readable storage media of claim 21, wherein the computer-executable instructions cause the at least one processor to perform operations further comprising analyzing the plurality of damaged locations to determine a distance between each of the plurality of damaged locations.

24. The at least one non-transitory computer-readable storage media of claim 23, wherein the computer-executable instructions cause the at least one processor to perform operations further comprising determining, based upon the analyzing, that the plurality of damaged locations are not a result of hail damage based upon the distance between at least some of the plurality of damaged locations being substantially uniform.

25. The at least one non-transitory computer-readable storage media of claim 23, wherein the computer-executable instructions cause the at least one processor to perform operations further comprising: determining, based upon the analyzing, that the plurality of damaged locations are a result of hail damage based upon the distance between at least some of the plurality of damaged locations being not substantially uniform.

* * * * *